United States Patent
Snover et al.

(10) Patent No.: US 8,230,405 B2
(45) Date of Patent: *Jul. 24, 2012

(54) ADMINISTRATIVE TOOL ENVIRONMENT

(75) Inventors: Jeffrey P. Snover, Woodinville, WA (US); Daryl W. Wray, Redmond, WA (US); James W. Truher, III, Bellevue, WA (US); Bruce G. Payette, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1553 days.

This patent is subject to a terminal disclaimer.

(21) Appl. No.: 11/678,555

(22) Filed: Feb. 23, 2007

(65) Prior Publication Data

US 2007/0135949 A1    Jun. 14, 2007

Related U.S. Application Data

(63) Continuation of application No. 10/882,609, filed on Jun. 30, 2004, now Pat. No. 7,243,344, which is a continuation of application No. 10/693,785, filed on Oct. 24, 2003, now Pat. No. 7,155,706.

(51) Int. Cl.
*G06F 9/45* (2006.01)
(52) U.S. Cl. ...................................................... 717/143
(58) Field of Classification Search .................. 717/143
See application file for complete search history.

(56) References Cited

U.S. PATENT DOCUMENTS

| | | | |
|---|---|---|---|
| 5,404,528 A | 4/1995 | Mahajan | |
| 6,078,743 A | 6/2000 | Apte et al. | |
| 6,292,936 B1 | 9/2001 | Wang | |
| 6,651,241 B1 | 11/2003 | Hernandez, III | |
| 6,718,371 B1 | 4/2004 | Lowry et al. | |
| 6,785,685 B2 | 8/2004 | Soetarman et al. | |
| 6,823,504 B1 | 11/2004 | Sokolov | |
| 6,848,101 B2 | 1/2005 | Maekawa et al. | |
| 6,880,125 B2 | 4/2005 | Fry | |
| 6,950,866 B1 | 9/2005 | Lowry et al. | |
| 7,284,274 B1 | 10/2007 | Walls et al. | |
| 7,665,074 B2 * | 2/2010 | Pandit et al. | 717/143 |
| 2002/0073330 A1 | 6/2002 | Chandnani et al. | |
| 2002/0078382 A1 | 6/2002 | Sheikh et al. | |
| 2003/0200349 A1 | 10/2003 | Hansen | |
| 2004/0068715 A1 | 4/2004 | Wong et al. | |

(Continued)

OTHER PUBLICATIONS

Brun et al., "ROOT—An Object Oriented Data Analysis Framework", Nuclear Instruments & Methods in Physics Research, Section A, vol. 389, No. 1-2, pp. 81-86, Apr. 1997.

(Continued)

*Primary Examiner* — John Chavis
(74) *Attorney, Agent, or Firm* — Lee & Haynes, PLLC

(57) ABSTRACT

In an administrative tool environment, user input is supplied to an administrative tool framework for processing. The administrative tool framework maps user input to cmdlet objects. The cmdlet objects describe a grammar for parsing the user input and input objects to obtain expected input parameters. The input objects are emitted by one cmdlet and are available as input to another cmdlet. The input objects may be any precisely parseable input, such as .NET objects, plain strings, XML documents, and the like. The input objects are not live objects. The cmdlets may operate within the same process. Alternatively, one cmdlet may operate locally while another cmdlet operates remotely. The cmdlets may be provided by the administrative tool framework or may be provided by third party developers. The user input may be supplied to the framework via a host cmdlet.

20 Claims, 23 Drawing Sheets

U.S. PATENT DOCUMENTS

| | | |
|---|---|---|
| 2004/0153967 A1 | 8/2004 | Bender et al. |
| 2004/0210828 A1 | 10/2004 | Langer |
| 2005/0071369 A1 | 3/2005 | Lang et al. |
| 2005/0108518 A1 | 5/2005 | Pandya |
| 2005/0182958 A1 | 8/2005 | Pham et al. |

OTHER PUBLICATIONS

"Command Line Tailors Software to Buying Operations", Purchasing Software News, vol. 127, No. 4, pp. 153-156, Sep. 1999.

Dykhuis, "Beefing Up Dos with 4DOS", Computers in Libraries, vol. 11, No. 4, pp. 35-37, Apr. 1991.

Flower, "Step-Up to MS-DOS 6.2: An Early Look at Microsoft's Latest Upgrade", Computer in Libraries, vol. 14, No. 2, pp. 30-32, Feb. 1994.

Todd, "Installing MS-DOS Device Drivers from the Command Line", EXE, vol. 4, No. 3, pp. 16-21, Aug. 1989.

Linthicum, "Java Development Environments Evolve", Object Magazine, vol. 8, No. 4, pp. 45-46, 48-49, Jun. 1998.

"No Time for GUI's", Digital Systems Report, Computer Electronics, Inc., vol. 19, No. 4, pp. 1-4, Winter 1997.

Olivastro, "Modifying DCL Commands in VAX/VMS: The Command Definition Utility", The VAX Professional, vol. 8, pp. 50-53, Apr. 1986.

Sorzano, et al., "Command-Line Interfaces Can Be Efficiently Brought to Graphics: COLIMATE (the COmmand LIne MATE)", Software-Practice and Experience, vol. 32, No. 9, pp. 873-887, Mar. 2002.

Tucker, "Windows CE's CESH Utility", Dr. Dobb's Journal, vol. 25, No. 5, http://www.ddj.com, pp. 74-80, May 2000.

Yager, "Taking Command of Windows NT", Unix Review, vol. 15, No. 11, pp. 31-32, 34, 36, 38, 40, Oct. 1997.

Korean Office Action mailed Mar. 16, 2011 for Korean Patent Application No. 10-2005-7008069, a counterpart foreign application of US Patent No. 7,155,706, 8 pgs.

"Intro to Unix: Pipes and Filters", Dec. 15, 2001, retrieved from the internet at http://web/archive/org/20011216234529/http://www.december.com/unix/tutor/pipesfilters.html on Jul. 28, 2008, 2 pgs.

Jaeger, et al, "Support for the File System Security Requriements of Computational E-Mail Systems", ACM, 1994, 9 pgs.

Kc, et al, "Countering Code-Injection Attacks with Instruction-Set Randomization", ACM, 2003, 9 pgs.

Ramey et al., "Bash Reference Manual", Nov. 2001, retrieved from the Internet at http://gd.tuwien.ac.at/utils/shells/bashref.pdf on Jul. 25, 2008, 138 pgs.

Varian, "Plunging into Pipes", 1992 Proc of REXX Symposium for Developers and Users, Oct. 7, 1991, 24 pgs.

\* cited by examiner

```
600                          602
                       public class cmdLet
                       {
610                        Bool verbose;
620                        Bool whatif;
630                        Bool confirm;

608                        Bool confirmProcessing(string, args)
                           {
640                            checkSecurity();

612                            if(verbose == TRUE)
                               {
                                   echo $CMDLET + $args        614
                                   return true;
                               }
622                            if(whatif == TRUE)
                               {
                                   echo # + $CMDLET + $args    624
                                   return false;
                               }
632                            if(confirm == TRUE)
                               {
                                   echo $CMDLET + $args
                                   echo "Y/N: "
                                   switch Read()               634
                                   {
                                       y : return true;
                                       n : return false;
                                   }
                               }
                           }
                       }
```

*Fig. 6*

```
                    702
700                  /       704
 \                  /        /
    [cmdletDeclaration ([verb]\[noun])]
    public class <command name> : CmdLet
    {
510 ─────── [<Parsing Directive>]
512 ─────── [<Data Validation Directive>]
514 ─────── [<Data Generation Directive>]
516 ─────── [<Processing Directive>]
518 ─────── [<Encoding Directive>]
520 ─────── [<Documentation Directive>]

731 ─────── [ParsingCommandLineInput]
730 ─────── public string Name;

733 ─────── [ParsingCommandLineInput]
732 ─────── public Bool Recurse;

740 ─────── private <type> <name>

2100
EXEMPLARY DISPLAY
INFORMATION

```
<DISPLAYINFO>
  <TYPE> DIRECTORYINFO </TYPE>
  <SHAPE> TABLE </SHAPE>
  <COLUMNS>
    <COLUMN>
      <PROPERTYNAME> LASTWRITETIME </PROPERTYNAME>
    </COLUMN>
    <COLUMN>
      <PROPERTYNAME> SIZE </PROPERTYNAME>
      <ALIGN> LEFT </ALIGN>
      <WIDTH> 10 </WIDTH>
      <FORMATSTRING> D </FORMATSTRING>
      <LABEL> SIZE </LABEL>
    </COLUMN>
  </COLUMNS>
  <HEADER>
   ...
  </HEADER>
  <GROUPBY> PARENTPATH </GROUPBY>
  ...
</DISPLAYINFO>
```

```
[1]$ dir | format/table | out/console

Written                 Length.kb Name
6/28/2002 12:52:10 PM      189    sd.exe
11/7/2002 10:59:18 AM        0    sd.ini
6/28/2002 12:52:10 PM    2,633    sd.pdb
6/28/2002 12:52:18 PM      223    sdscc.dll

[2]$ dir | format/list brief.set | convert/text | out/console

Written    : 6/28/2002 12:52:10 PM
Length.kb : 189
Name       : sd.exe

Written    : 11/7/2002 10:59:18 AM
Length.kb : 0
Name       : sd.ini

Written    : 6/28/2002 12:52:10 PM
Length.kb : 2633
Name       : sd.pdb

[27]$ %mymarkupspec = {where length.kb -gt 500 => {applyto => all,
font.name => arial, font.style => bold, font.color => blue}
[28]$ dir i*| format/table | markup %mymarkupspec | out/console Written                  Length.kb              Name
=====================    ============    ==============================
9/11/2002 3:11:10 PM        1,020        Interop.Excel.dll
9/11/2002 3:11:10 PM          192        Interop.Microsoft.Office.Core.dll
9/11/2002 3:11:10 PM          120        Interop.SHDocVw.dll
9/11/2002 3:11:09 PM           12        Interop.TASKSCHEDULERLib.dll
9/11/2002 3:11:10 PM           56        Interop.VBIDE.dll

[1]$ dir | format/table | convert/csv | out/console

"Written","Length.kb","Name"
"6/28/2002 12:52:10 PM","189","sd.exe"
"11/7/2002 10:59:18 AM","0","sd.ini"
"6/28/2002 12:52:10 PM","2633","sd.pdb"
"6/28/2002 12:52:18 PM","223","sdscc.dll"
```

*Fig. 23*

ADMINISTRATIVE TOOL ENVIRONMENT

RELATED APPLICATIONS

This is a continuation of copending U.S. patent application Ser. No. 10/882,609 filed on Jun. 30, 2004 entitled "Administrative Tool Environment," which is, in turn, a continuation of U.S. Pat. No. 7,155,706 issued on Dec. 26, 2006, entitled "Administrative Tool Environment."

TECHNICAL FIELD

Subject matter disclosed herein relates to runtime environments, and in particular to administrative tool environments for automating administrative tasks.

BACKGROUND OF THE INVENTION

Administrative tasks support the day to day operation of computing devices, such as laptop, desktops, and the like. For example, administrative tasks typically allow a user to create a new folder, install or upgrade an application, and perform various other system tasks. System administrators, who maintain networked computers, perform even more complex administrative tasks, such as creating new users, deploying software and software patches, monitoring the network, troubleshooting the network, and the like. Often, command line interfaces or graphical user interfaces (GUI) facilitate execution of administrative tasks.

Most graphical user interfaces require the user to navigate a series of menus or pages and then click on a desired option. According to such interfaces, the user is required to follow the series of menus or pages and is not allowed to jump from one page to another without starting over or traversing up and back down the series of pages. Such interfaces may be referred to as restricted navigation interfaces wherein the user must follow a regimented and predetermined procedure to achieve an administrative goal. A novice user may benefit from using such a GUI because it provides helpful information on each menu or page that directs the novice user to the desired administrative task. However, for many advanced users, such as system administrators, using a GUI that has rigid navigation restrictions is very cumbersome. These advanced users already know the administrative task that they want to perform. In addition, advance users desire at least some degree of task automation. However, automating administrative tasks accessed through a GUI is very difficult. Also, if the GUI changes, the corresponding automation may no longer operate properly. Thus, many advanced users prefer using a more robust command line interface.

A command line interface allows a user to directly perform a task by typing in a command. One disadvantage with a command line interface is that the user must know the exact command to type in because helpful information is not provided on the display. However, once the command is known, it becomes much more efficient to type the command than to navigate a series of menus. In addition, tasks executed from a command line interface may be automated. For example, when users notice that they are continually typing the same commands (e.g., a series of commands, etc.) they may create a script (e.g., a .bat file) that includes the repetitive commands. When the script is executed, all the commands listed in the script are executed. The users may also soon notice that different scripts contain similar items. Upon noticing this, the users may wish to create parameterized subroutines within the script to further automate the tasks.

However, many scripting solutions that provide sophisticated automation features (e.g., parameterized subroutines) are developed in the same manner as a full blown application and require system programming knowledge. Thus, these solutions are not ideal for system administrators who do not generally have sophisticated programming knowledge.

Therefore, currently, system administrators must either forego automation or automate using systems programming skills. Neither option is highly desirable. If the administrator selects to forego automation, additional costs are incurred to support several other administrators to help run the tasks manually. However, if the administrator selects to automate the tasks, costs are incurred to support a programming environment and to obtain the necessary programming skills. In addition, maintenance costs are expensive because the automated tool must be rebuilt whenever a change occurs.

Therefore, there is a need for an administrative tool framework that allows administrators to effectively and efficiently automate administrative tasks.

SUMMARY OF THE INVENTION

An administrative tool framework is provided. User input is supplied to the administrative tool framework for processing. The administrative tool framework maps user input to cmdlet objects. The cmdlet object is associated with a grammar for parsing the user input and input objects to obtain expected input parameters identified within the cmdlet. The grammar may be associated directly within the cmdlet, such as using parameter declarations. Alternatively, the grammar may be associated indirectly with the cmdlet, such through an XML document. The input objects are emitted by one cmdlet and are available as input to another cmdlet. The input objects may be any precisely parseable input, such as .NET objects, plain strings, XML documents, and the like. The cmdlets may operate within the same process. Alternatively, one cmdlet may operate locally while another cmdlet operates in another process or remotely. The cmdlets may be provided by the administrative tool framework or may be provided by third party developers. The user input may be supplied to the framework via a host cmdlet.

BRIEF DESCRIPTION OF THE DRAWINGS

FIG. 6 is an exemplary data structure for specifying a command base type from which a cmdlet shown in FIG. 5 is derived.

FIG. 7 is another exemplary data structure for specifying a cmdlet suitable for use within the administrative tool framework shown in FIG. 2.

FIG. 21 graphically depicts an exemplary structure for display information accessed during the processing of FIG. 20.

FIG. 23 illustrates results rendered by the out/console cmdlet using various pipeline sequences of the output processing cmdlets.

DETAILED DESCRIPTION

Briefly stated, the present administrative tool environment provides a computing framework that reduces administrative costs associated with maintaining and supporting computers and computer networks. In addition, the framework supports rapid ad-hoc development of administrative tools by both programmers and non-programmers.

The following description sets forth a specific exemplary administrative tool environment. Other exemplary environments may include features of this specific embodiment and/or other features, which aim to facilitate administrative tasks.

The following detailed description is divided into several sections. A first section describes an illustrative computing environment in which the administrative tool environment may operate. A second section describes an exemplary framework for the administrative tool environment. Subsequent sections describe individual components of the exemplary framework and the operation of these components.

Exemplary Computing Environment

Figure 1:
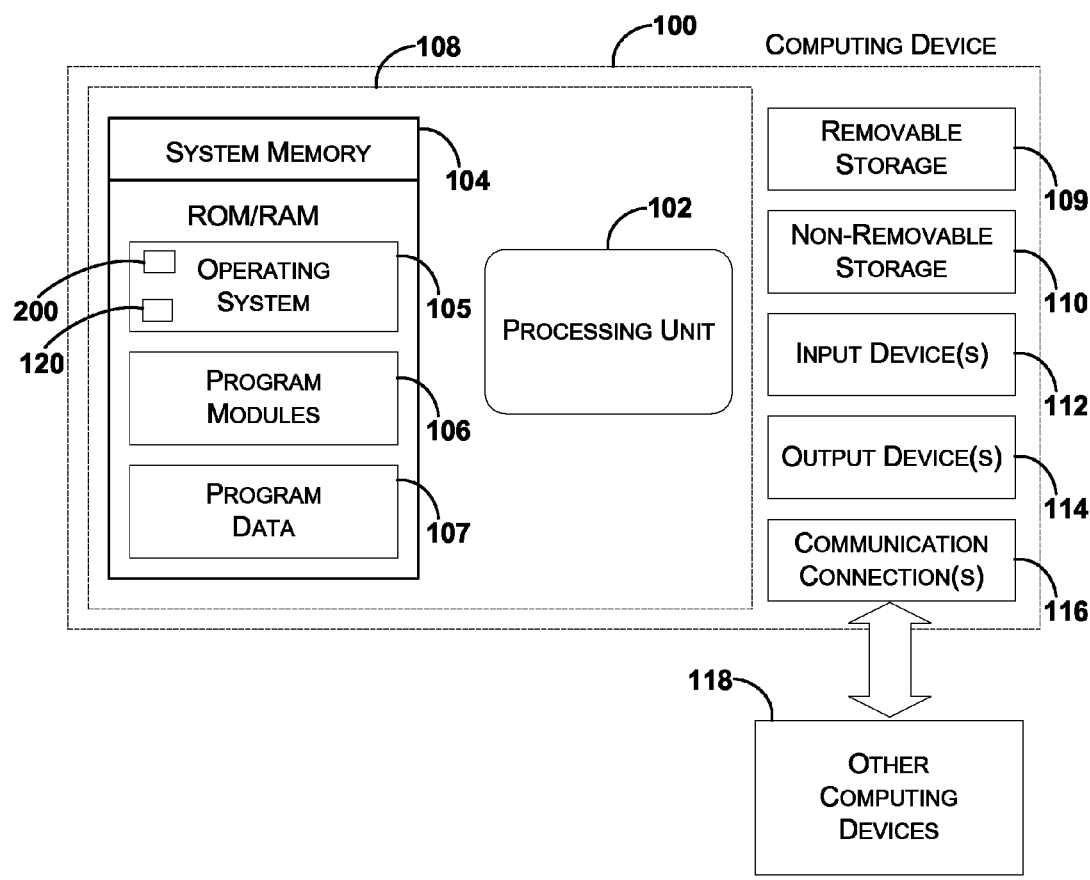
FIG. 1 illustrates an exemplary computing device that may use an exemplary administrative tool environment.

FIG. 1 illustrates an exemplary computing device that may be used in an exemplary administrative tool environment. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The operating system 106 include a component-based framework 120 that supports components (including properties and events), objects, inheritance, polymorphism, reflection, and provides an object-oriented component-based application programming interface (API), such as that of the .NET™ Framework manufactured by Microsoft Corporation, Redmond, Wash. The operating system 105 also includes an administrative tool framework 200 that interacts with the component-based framework 120 to support development of administrative tools (not shown). This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Exemplary Administrative Tool Framework

Figure 2:
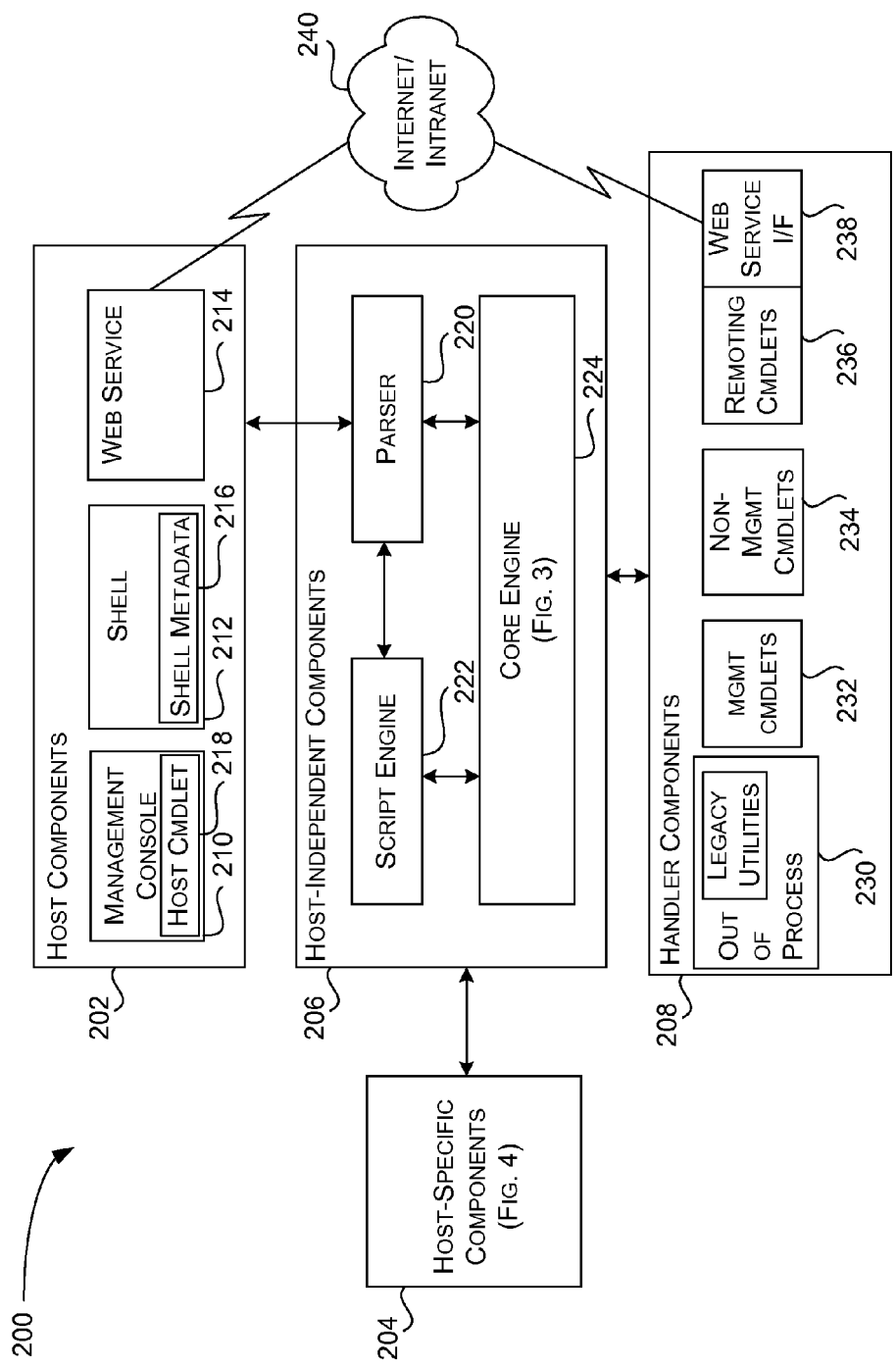
FIG. 2 is a block diagram generally illustrating an overview of an exemplary administrative tool framework for the present administrative tool environment.

FIG. 2 is a block diagram generally illustrating an overview of an exemplary administrative tool framework 200. Administrative tool framework 200 includes one or more host components 202, host-specific components 204, host-independent components 206, and handler components 208. The host-independent components 206 may communicate with each of the other components (i.e., the host components 202, the host-specific components 204, and the handler components 208). Each of these components are briefly described below and described in further detail, as needed, in subsequent sections.

Host Components

The host components 202 include one or more host programs (e.g., host programs 210-214) that expose automation features for an associated application to users or to other programs. Each host program 210-214 may expose these automation features in its own particular style, such as via a command line, a graphical user interface (GUI), a voice recognition interface, application programming interface (API), a scripting language, a web service, and the like. However, each of the host programs 210-214 expose the one or more automation features through a mechanism provided by the administrative tool framework.

In this example, the mechanism uses cmdlets to surface the administrative tool capabilities to a user of the associated host program 210-214. In addition, the mechanism uses a set of interfaces made available by the host to embed the administrative tool environment within the application associated with the corresponding host program 210-214. Throughout the following discussion, the term "cmdlet" is used to refer to commands that are used within the exemplary administrative tool environment described with reference to FIGS. 2-23.

Cmdlets correspond to commands in traditional administrative environments. However, cmdlets are quite different than these traditional commands. For example, cmdlets are typically smaller in size than their counterpart commands because the cmdlets can utilize common functions provided by the administrative tool framework, such as parsing, data validation, error reporting, and the like. Because such common functions can be implemented once and tested once, the use of cmdlets throughout the administrative tool framework allows the incremental development and test costs associated with application-specific functions to be quite low compared to traditional environments.

In addition, in contrast to traditional environments, cmdlets do not need to be stand-alone executable programs. Rather, cmdlets may run in the same processes within the administrative tool framework. This allows cmdlets to exchange "live" objects between each other. This ability to exchange "live" objects allows the cmdlets to directly invoke methods on these objects. The details for creating and using cmdlets are described in further detail below.

In overview, each host program 210-214 manages the interactions between the user and the other components within the administrative tool framework. These interactions may include prompts for parameters, reports of errors, and the like. Typically, each host program 210-213 may provide its own set of specific host cmdlets (e.g., host cmdlets 218). For example, if the host program is an email program, the host program may provide host cmdlets that interact with mailboxes and messages. Even though FIG. 2 illustrates host programs 210-214, one skilled in the art will appreciate that host components 202 may include other host programs associated with existing or newly created applications. These other host programs will also embed the functionality provided by the administrative tool environment within their associated application. The processing provided by a host program is described in detail below in conjunction with FIG. 8.

In the examples illustrated in FIG. 2, a host program may be a management console (i.e., host program 210) that provides a simple, consistent, administration user interface for users to create, save, and open administrative tools that manage the hardware, software, and network components of the computing device. To accomplish these functions, host program 210 provides a set of services for building management GUIs on top of the administrative tool framework. The GUI interactions may also be exposed as user-visible scripts that help teach the users the scripting capabilities provided by the administrative tool environment.

In another example, the host program may be a command line interactive shell (i.e., host program 212). The command line interactive shell may allow shell metadata 216 to be input on the command line to affect processing of the command line.

In still another example, the host program may be a web service (i.e., host program 214) that uses industry standard specifications for distributed computing and interoperability across platforms, programming languages, and applications.

In addition to these examples, third parties may add their own host components by creating "third party" or "provider" interfaces and provider cmdlets that are used with their host program or other host programs. The provider interface exposes an application or infrastructure so that the application or infrastructure can be manipulated by the administrative tool framework. The provider cmdlets provide automation for navigation, diagnostics, configuration, lifecycle, operations, and the like. The provider cmdlets exhibit polymorphic cmdlet behavior on a completely heterogeneous set of data stores. The administrative tool environment operates on the provider cmdlets with the same priority as other cmdlet classes. The provider cmdlet is created using the same mechanisms as the other cmdlets. The provider cmdlets expose specific functionality of an application or an infrastructure to the administrative tool framework. Thus, through the use of cmdlets, product developers need only create one host component that will then allow their product to operate with many administrative tools. For example, with the exemplary administrative tool environment, system level graphical user interface help menus may be integrated and ported to existing applications.

Host-Specific Components

The host-specific components 204 include a collection of services that computing systems (e.g., computing device 100 in FIG. 1) use to isolate the administrative tool framework from the specifics of the platform on which the framework is running. Thus, there is a set of host-specific components for each type of platform. The host-specific components allow the users to use the same administrative tools on different operating systems.

Figure 3:
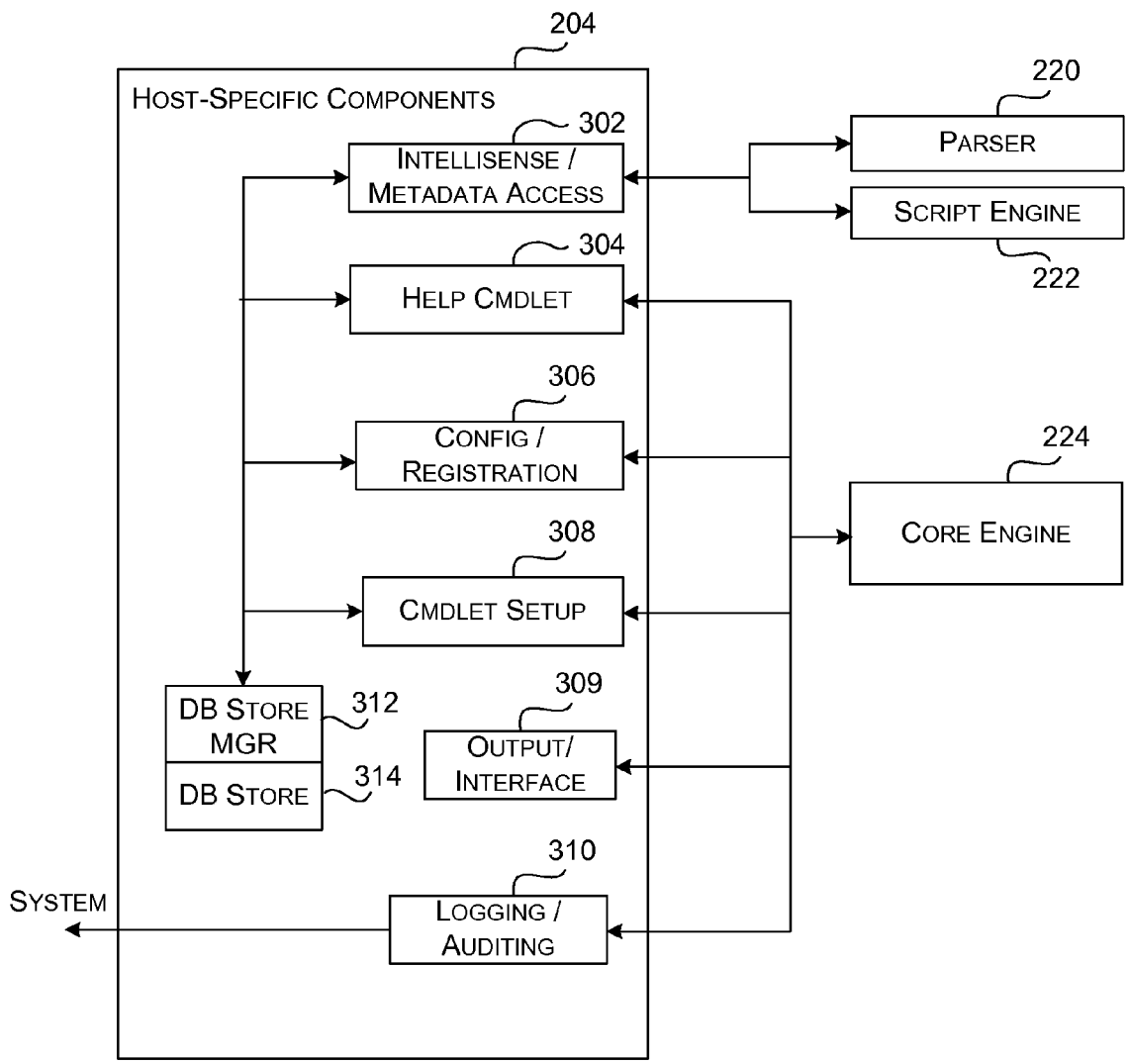
FIG. 3 is a block diagram illustrating components within the host-specific components of the administrative tool framework shown in FIG. 2.

Turning briefly to FIG. 3, the host-specific components 204 may include an intellisense/metadata access component 302, a help cmdlet component 304, a configuration/registration component 306, a cmdlet setup component 308, and an output interface component 309 Components 302-308 communicate with a database store manager 312 associated with a database store 314. The parser 220 and script engine 222 communicate with the intellisense/metadata access component 302. The core engine 224 communicates with the help cmdlet component 304, the configuration/registration component 306, the cmdlet setup component 308, and the output interface component 309. The output interface component 309 includes interfaces provided by the host to out cmdlets. These out cmdlets can then call the host's output object to perform the rendering. Host-specific components 204 may also include a logging/auditing component 310, which the core engine 224 uses to communicate with host specific (i.e., platform specific) services that provide logging and auditing capabilities.

In one exemplary administrative tool framework, the intellisense/metadata access component 302 provides auto-completion of commands, parameters, and parameter values. The help cmdlet component 304 provides a customized help system based on a host user interface.

Handler Components

Referring back to FIG. 2, the handler components 208 includes legacy utilities 230, management cmdlets 232, non-management cmdlets 234, remoting cmdlets 236, and a web service interface 238. The management cmdlets 232 (also referred to as platform cmdlets) include cmdlets that query or manipulate the configuration information associated with the computing device. Because management cmdlets 232 manipulate system type information, they are dependant upon a particular platform. However, each platform typically has management cmdlets 232 that provide similar actions as management cmdlets 232 on other platforms. For example, each platform supports management cmdlets 232 that get and set system administrative attributes (e.g., get/process, set/IPAddress). The host-independent components 206 communicate with the management cmdlets via cmdlet objects generated within the host-independent components 206. Exemplary data structures for cmdlets objects will be described in detail below in conjunction with FIGS. 5-7.

The non-management cmdlets 234 (sometimes referred to as base cmdlets) include cmdlets that group, sort, filter, and perform other processing on objects provided by the management cmdlets 232. The non-management cmdlets 234 may also include cmdlets for formatting and outputting data associated with the pipelined objects. An exemplary mechanism for providing a data driven command line output is described below in conjunction with FIGS. 19-23. The non-management cmdlets 234 may be the same on each platform and provide a set of utilities that interact with host-independent components 206 via cmdlet objects. The interactions between the non-management cmdlets 234 and the host-independent components 206 allow reflection on objects and allow processing on the reflected objects independent of their (object) type. Thus, these utilities allow developers to write non-management cmdlets once and then apply these non-management cmdlets across all classes of objects supported on a computing system. In the past, developers had to first comprehend the format of the data that was to be processed and then write the application to process only that data. As a consequence, traditional applications could only process data of a very limited scope. One exemplary mechanism for processing objects independent of their object type is described below in conjunction with FIG. 18.

The legacy utilities 230 include existing executables, such as win32 executables that run under cmd.exe. Each legacy utility 230 communicates with the administrative tool framework using text streams (i.e., stdin and stdout), which are a type of object within the object framework. Because the legacy utilities 230 utilize text streams, reflection-based operations provided by the administrative tool framework are not available. The legacy utilities 230 execute in a different process than the administrative tool framework. Although not shown, other cmdlets may also operate out of process.

The remoting cmdlets 236, in combination with the web service interface 238, provide remoting mechanisms to access interactive and programmatic administrative tool environments on other computing devices over a communication media, such as internet or intranet (e.g., internet/intranet 240 shown in FIG. 2). In one exemplary administrative tool framework, the remoting mechanisms support federated services that depend on infrastructure that spans multiple independent control domains. The remoting mechanism allows scripts to execute on remote computing devices. The scripts may be run on a single or on multiple remote systems. The results of the scripts may be processed as each individual script completes or the results may be aggregated and processed en-masse after all the scripts on the various computing devices have completed.

For example, web service 214 shown as one of the host components 202 may be a remote agent. The remote agent handles the submission of remote command requests to the parser and administrative tool framework on the target system. The remoting cmdlets serve as the remote client to provide access to the remote agent. The remote agent and the remoting cmdlets communicate via a parsed stream. This parsed stream may be protected at the protocol layer, or additional cmdlets may be used to encrypt and then decrypt the parsed stream.

Host-Independent Components

The host-independent components 206 include a parser 220, a script engine 222 and a core engine 224. The host-independent components 206 provide mechanisms and services to group multiple cmdlets, coordinate the operation of the cmdlets, and coordinate the interaction of other resources, sessions, and jobs with the cmdlets.

Exemplary Parser

The parser 220 provides mechanisms for receiving input requests from various host programs and mapping the input requests to uniform cmdlet objects that are used throughout the administrative tool framework, such as within the core engine 224. In addition, the parser 220 may perform data processing based on the input received. One exemplary method for performing data processing based on the input is described below in conjunction with FIG. 12. The parser 220 of the present administrative tool framework provides the capability to easily expose different languages or syntax to users for the same capabilities. For example, because the parser 220 is responsible for interpreting the input requests, a change to the code within the parser 220 that affects the expected input syntax will essentially affect each user of the administrative tool framework. Therefore, system administrators may provide different parsers on different computing devices that support different syntax. However, each user operating with the same parser will experience a consistent syntax for each cmdlet. In contrast, in traditional environments, each command implemented its own syntax. Thus, with thousands of commands, each environment supported several different syntax, usually many of which were inconsistent with each other.

Exemplary Script Engine

The script engine 222 provides mechanisms and services to tie multiple cmdlets together using a script. A script is an aggregation of command lines that share session state under strict rules of inheritance. The multiple command lines within the script may be executed either synchronously or asynchronously, based on the syntax provided in the input request. The script engine 222 has the ability to process control structures, such as loops and conditional clauses and to process variables within the script. The script engine also manages session state and gives cmdlets access to session data based on a policy (not shown).

Exemplary Core Engine

Figure 4:
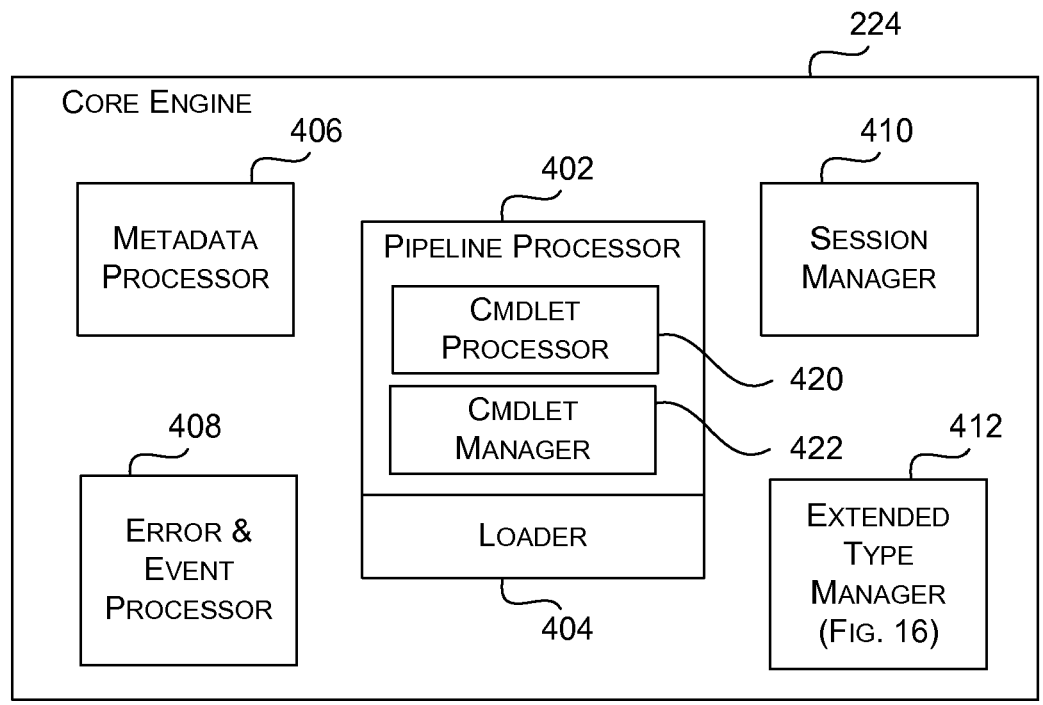
FIG. 4 is a block diagram illustrating components within the core engine component of the administrative tool framework shown in FIG. 2.

The core engine 224 is responsible for processing cmdlets identified by the parser 220. Turning briefly to FIG. 4, an exemplary core engine 224 within the administrative tool framework 200 is illustrated. The exemplary core engine 224 includes a pipeline processor 402, a loader 404, a metadata processor 406, an error & event handler 408, a session manager 410, and an extended type manager 412.

Exemplary Metadata Processor

The metadata processor 406 is configured to access and store metadata within a metadata store, such as database store 314 shown in FIG. 3. The metadata may be supplied via the command line, within a cmdlet class definition, and the like. Different components within the administrative tool framework 200 may request the metadata when performing their processing. For example, parser 202 may request metadata to validate parameters supplied on the command line.

Exemplary Error & Event Processor

The error & event processor 408 provides an error object to store information about each occurrence of an error during processing of a command line. For additional information about one particular error and event processor which is particularly suited for the present administrative tool framework, refer to U.S. patent application Ser. No. 10/413,054, entitled "System and Method for Persisting Error Information in a Command Line Environment", which is owned by the same assignee as the present invention, and is incorporated here by reference.

Exemplary Session Manager

The session manager 410 supplies session and state information to other components within the administrative tool framework 200. The state information managed by the session manager may be accessed by any cmdlet, host, or core engine via programming interfaces. These programming interfaces allow for the creation, modification, and deletion of state information.

Exemplary Pipeline Processor and Loader

The loader 404 is configured to load each cmdlet in memory in order for the pipeline processor 402 to execute the cmdlet. The pipeline processor 402 includes a cmdlet processor 420 and a cmdlet manager 422. The cmdlet processor 420 dispatches individual cmdlets. If the cmdlet requires execution on a remote, or a set of remote machines, the cmdlet processor 420 coordinates the execution with the remoting cmdlet 236 shown in FIG. 2. The cmdlet manager 422 handles the execution of aggregations of cmdlets. The cmdlet manager 422, the cmdlet processor 420, and the script engine 222 (FIG. 2) communicate with each other in order to perform the processing on the input received from the host program 210-214. The communication may be recursive in nature. For example, if the host program provides a script, the script may invoke the cmdlet manager 422 to execute a cmdlet, which itself may be a script. The script may then be executed by the script engine 222. One exemplary process flow for the core engine is described in detail below in conjunction with FIG. 14.

Exemplary Extended Type Manager

As mentioned above, the administrative tool framework provides a set of utilities that allows reflection on objects and allows processing on the reflected objects independent of their (object) type. The administrative tool framework 200 interacts with the component framework on the computing system (component framework 120 in FIG. 1) to perform this reflection. As one skilled in the art will appreciate, reflection provides the ability to query an object and to obtain a type for the object, and then reflect on various objects and properties associated with that type of object to obtain other objects and/or a desired value.

Even though reflection provides the administrative tool framework 200 a considerable amount of information on objects, the inventors appreciated that reflection focuses on the type of object. For example, when a database datatable is reflected upon, the information that is returned is that the datatable has two properties: a column property and a row property. These two properties do not provide sufficient detail regarding the "objects" within the datatable. Similar problems arise when reflection is used on extensible markup language (XML) and other objects.

Thus, the inventors conceived of an extended type manager 412 that focuses on the usage of the type. For this extended type manager, the type of object is not important. Instead, the extended type manager is interested in whether the object can be used to obtain required information. Continuing with the above datatable example, the inventors appreciated that knowing that the datatable has a column property and a row property is not particularly interesting, but appreciated that one column contained information of interest. Focusing on the usage, one could associate each row with an "object" and associate each column with a "property" of that "object". Thus, the extended type manager 412 provides a mechanism to create "objects" from any type of precisely parse-able input. In so doing, the extended type manager 412 supplements the reflection capabilities provided by the component-based framework 120 and extends "reflection" to any type of precisely parse-able input.

In overview, the extended type manager is configured to access precisely parse-able input (not shown) and to correlate the precisely parse-able input with a requested data type. The extended type manager 412 then provides the requested information to the requesting component, such as the pipeline processor 402 or parser 220. In the following discussion, precisely parse-able input is defined as input in which properties and values may be discerned. Some exemplary precisely parse-able input include Windows Management Instrumentation (WMI) input, ActiveX Data Objects (ADO) input, eXtensible Markup Language (XML) input, and object input, such as .NET objects. Other precisely parse-able input may include third party data formats.

Figure 18:
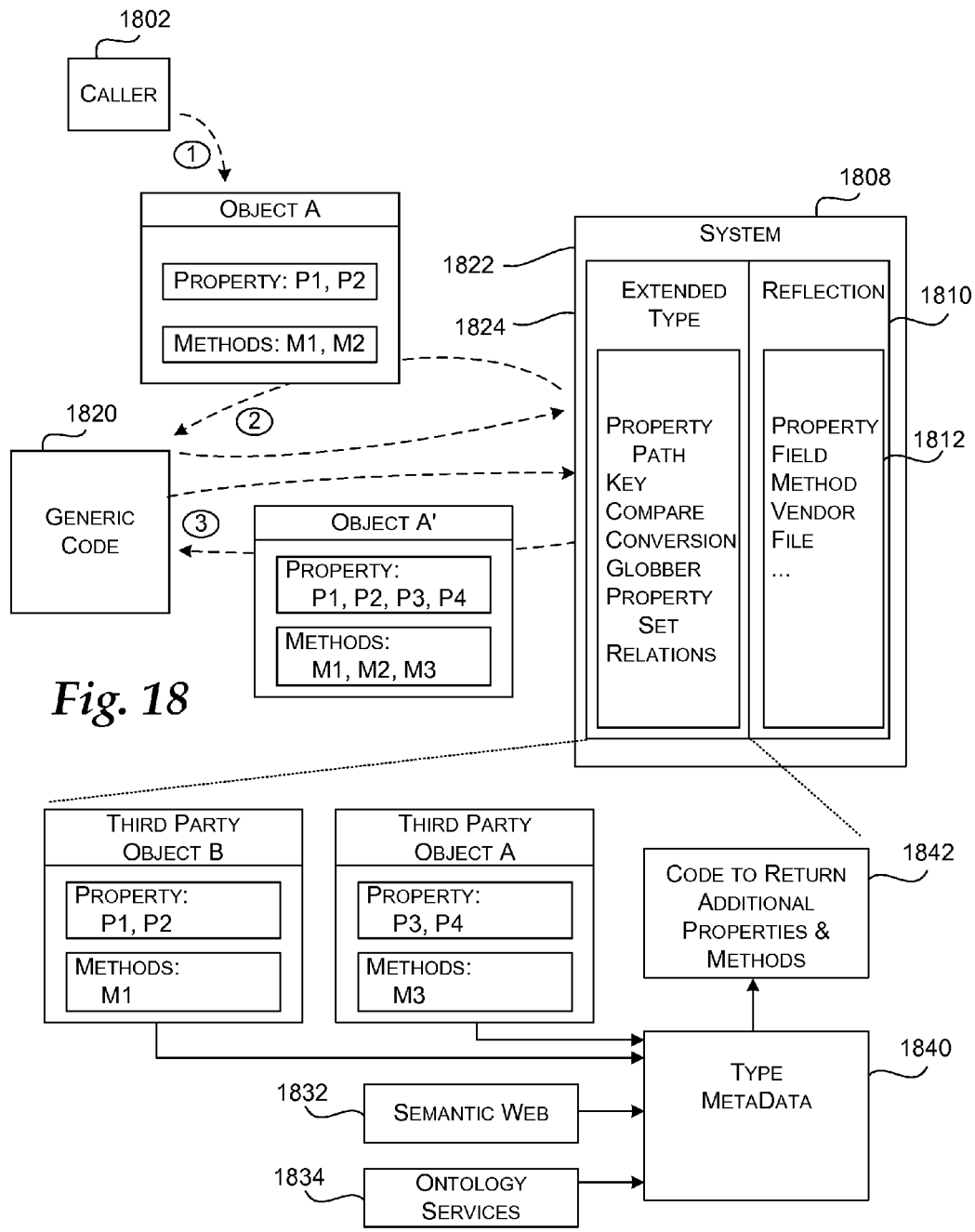
FIG. 18 is a functional block diagram of an exemplary extended type manager suitable for use within the administrative tool framework shown in FIG. 2.

Turning briefly to FIG. 18, a functional block diagram of an exemplary extended type manager for use within the administrative tool framework is shown. For explanation purposes, the functionality (denoted by the number "3" within a circle) provided by the extended type manager is contrasted with the functionality provided by a traditional tightly bound system (denoted by the number "1" within a circle) and the functionality provided by a reflection system (denoted by the number "2" within a circle). In the traditional tightly bound system, a caller 1802 within an application directly accesses the information (e.g., properties P1 and P2, methods M1 and M2) within object A. As mentioned above, the caller 1802 must know, a priori, the properties (e.g., properties P1 and P2) and methods (e.g., methods M1 and M2) provided by object A at compile time. In the reflection system, generic code 1820 (not dependent on any data type) queries a system 1808 that performs reflection 1810 on the requested object and returns the information (e.g., properties P1 and P2, methods M1 and M2) about the object (e.g., object A) to the generic code 1820. Although not shown in object A, the returned information may include additional information, such as vendor, file, date, and the like. Thus, through reflection, the generic code 1820 obtains at least the same information that the tightly bound system provides. The reflection system also allows the caller 1802 to query the system and get additional information without any a priori knowledge of the parameters.

In both the tightly bound systems and the reflection systems, new data types can not be easily incorporated within the operating environment. For example, in a tightly bound system, once the operating environment is delivered, the operating environment can not incorporate new data types because it would have to be rebuilt in order to support them. Likewise, in reflection systems, the metadata for each object class is fixed. Thus, incorporating new data types is not usually done.

However, with the present extended type manager new data types can be incorporated into the operating system. With the extended type manager 1822, generic code 1820 may reflect on a requested object to obtain extended data types (e.g., object A') provided by various external sources, such as a third party objects (e.g., object A' and B), a semantic web 1832, an ontology service 1834, and the like. As shown, the third party object may extend an existing object (e.g., object A') or may create an entirely new object (e.g., object B).

Each of these external sources may register their unique structure within a type metadata 1840 and may provide code 1842. When an object is queried, the extended type manager reviews the type metadata 1840 to determine whether the object has been registered. If the object is not registered within the type metadata 1840, reflection is performed. Otherwise, extended reflection is performed. The code 1842 returns the additional properties and methods associated with the type being reflected upon. For example, if the input type is XML, the code 1842 may include a description file that describes the manner in which the XML is used to create the objects from the XML document. Thus, the type metadata 1840 describes how the extended type manager 412 should query various types of precisely parse-able input (e.g., third party objects A' and B, semantic web 1832) to obtain the desired properties for creating an object for that specific input type and the code 1842 provides the instructions to obtain these desired properties. As a result, the extended type manager 412 provides a layer of indirection that allows "reflection" on all types of objects.

In addition to providing extended types, the extend type manager 412 provides additional query mechanisms, such as a property path mechanism, a key mechanism, a compare mechanism, a conversion mechanism, a globber mechanism, a property set mechanism, a relationship mechanism, and the like. Each of these query mechanisms, described below in the section "Exemplary Extended Type Manager Processing", provides flexibility to system administrators when entering command strings. Various techniques may be used to implement the semantics for the extended type manager. Three techniques are described below. However, those skilled in the art will appreciate that variations of these techniques may be used without departing from the scope of the claimed invention.

In one technique, a series of classes having static methods (e.g., getproperty( )) may be provided. An object is input into the static method (e.g., getproperty(object)), and the static method returns a set of results. In another technique, the operating environment envelopes the object with an adapter. Thus, no input is supplied. Each instance of the adapter has a getproperty method that acts upon the enveloped object and returns the properties for the enveloped object. The following is pseudo code illustrating this technique:

```
Class Adaptor
{
    Object X;
    getProperties( );
}.
```

In still another technique, an adaptor class subclasses the object. Traditionally, subclassing occurred before compilation. However, with certain operating environments, subclassing may occur dynamically. For these types of environments, the following is pseudo code illustrating this technique:

```
Class Adaptor : A
{
    getProperties( )
    {
        return data;
    }
}.
```

Thus, as illustrated in FIG. 18, the extended type manager allows developers to create a new data type, register the data type, and allow other applications and cmdlets to use the new data type. In contrast, in prior administrative environments, each data type had to be known at compile time so that a property or method associated with an object instantiated from that data type could be directly accessed. Therefore, adding new data types that were supported by the administrative environment was seldom done in the past.

Referring back to FIG. 2, in overview, the administrative tool framework 200 does not rely on the shell for coordinating the execution of commands input by users, but rather, splits the functionality into processing portions (e.g., host-independent components 206) and user interaction portions (e.g., via host cmdlets). In addition, the present administrative tool environment greatly simplifies the programming of administrative tools because the code required for parsing and data validation is no longer included within each command, but is rather provided by components (e.g., parser 220) within the administrative tool framework. The exemplary processing performed within the administrative tool framework is described below.

Exemplary Operation

Figure 5:
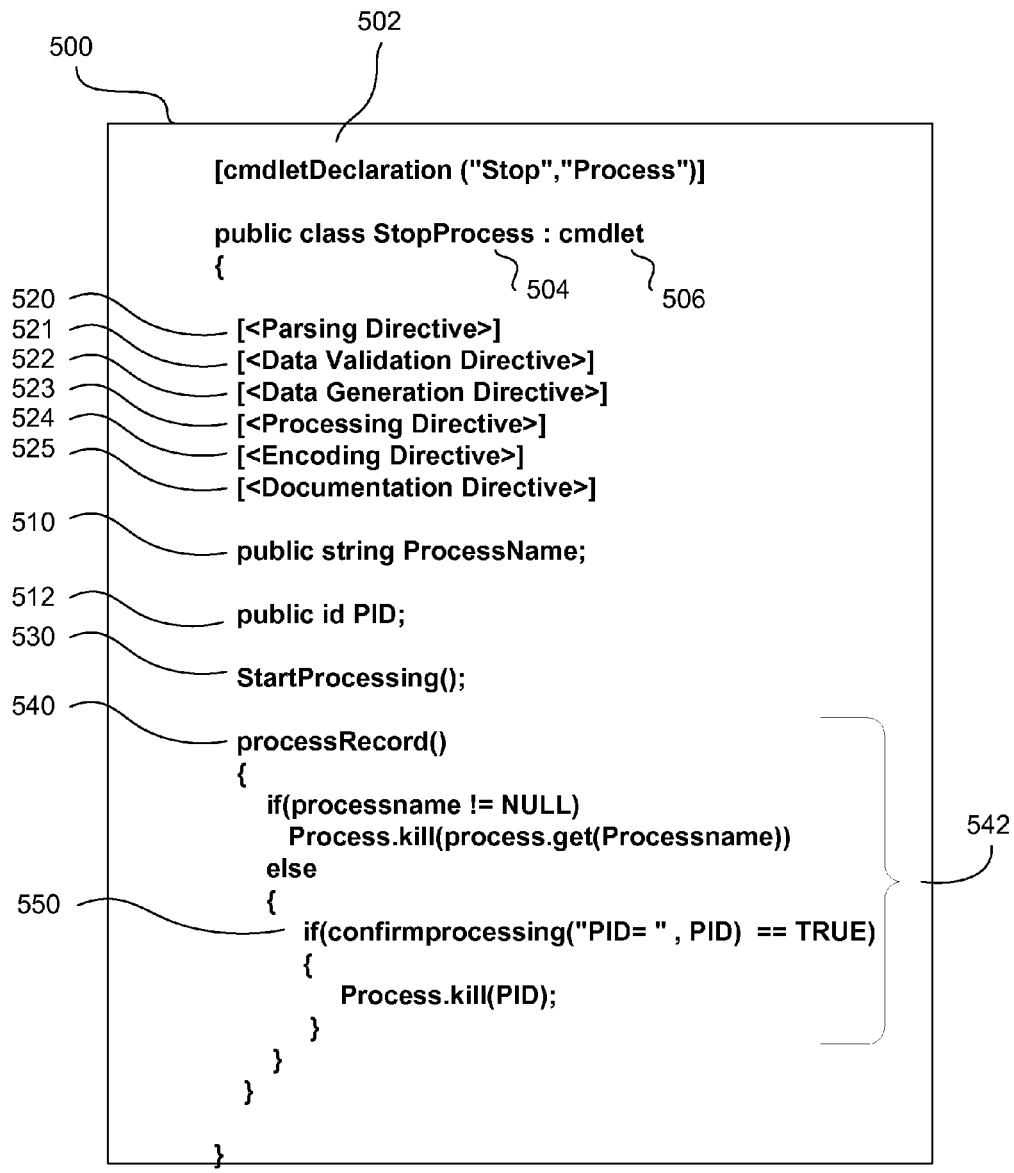
FIG. 5 is one exemplary data structure for specifying a cmdlet suitable for use within the administrative tool framework shown in FIG. 2.

FIGS. 5-7 graphically illustrate exemplary data structures used within the administrative tool environment. FIGS. 8-17 graphically illustrate exemplary processing flows within the administrative tool environment. One skilled in the art will appreciate that certain processing may be performed by a different component than the component described below without departing from the scope of the present invention. Before describing the processing performed within the components of the administrative tool framework, exemplary data structures used within the administrative tool framework are described.

Exemplary Data Structures for Cmdlet Objects

FIG. 5 is an exemplary data structure for specifying a cmdlet suitable for use within the administrative tool framework shown in FIG. 2. When completed, the cmdlet may be a management cmdlet, a non-management cmdlet, a host cmdlet, a provider cmdlet, or the like. The following discussion describes the creation of a cmdlet with respect to a system administrator's perspective (i.e., a provider cmdlet). However, each type of cmdlet is created in the same manner and operates in a similar manner. A cmdlet may be written in any language, such as C#. In addition, the cmdlet may be written using a scripting language or the like. When the administrative tool environment operates with the .NET Framework, the cmdlet may be a .NET object.

The provider cmdlet 500 (hereinafter, referred to as cmdlet 500) is a public class having a cmdlet class name (e.g., Stop-Process 504). Cmdlet 500 derives from a cmdlet class 506. An exemplary data structure for a cmdlet class 506 is described below in conjunction with FIG. 6. Each cmdlet 500 is associated with a command attribute 502 that associates a name (e.g., Stop/Process) with the cmdlet 500. The name is registered within the administrative tool environment. As will be described below, the parser looks in the cmdlet registry to identify the cmdlet 500 when a command string having the name (e.g., Stop/Process) is supplied as input on a command line or in a script.

The cmdlet 500 is associated with a grammar mechanism that defines a grammar for expected input parameters to the cmdlet. The grammar mechanism may be directly or indirectly associated with the cmdlet. For example, the cmdlet 500 illustrates a direct grammar association. In this cmdlet 500, one or more public parameters (e.g., ProcessName 510 and PID 512) are declared. The declaration of the public parameters drives the parsing of the input objects to the cmdlet 500. Alternatively, the description of the parameters may appear in an external source, such as an XML document. The description of the parameters in this external source would then drive the parsing of the input objects to the cmdlet.

Each public parameter 510, 512 may have one or more attributes (i.e., directives) associated with it. The directives may be from any of the following categories: parsing directive 521, data validation directive 522, data generation directive 523, processing directive 524, encoding directive 525, and documentation directive 526. The directives may be surrounded by square brackets. Each directive describes an operation to be performed on the following expected input parameter. Some of the directives may also be applied at a class level, such as user-interaction type directives. The directives are stored in the metadata associated with the cmdlet. The application of these attributes is described below in conjunction with FIG. 12.

These attributes may also affect the population of the parameters declared within the cmdlet. One exemplary process for populating these parameters is described below in conjunction with FIG. 16. The core engine may apply these directives to ensure compliance. The cmdlet 500 includes a first method 530 (hereinafter, interchangeably referred to as StartProcessing method 530) and a second method 540 (hereinafter, interchangeably referred to as processRecord method 540). The core engine uses the first and second methods 530, 540 to direct the processing of the cmdlet 500. For example, the first method 530 is executed once and performs set-up functions. The code 542 within the second method 540 is executed for each object (e.g., record) that needs to be processed by the cmdlet 500. The cmdlet 500 may also include a third method (not shown) that cleans up after the cmdlet 500.

Thus, as shown in FIG. 5, code 542 within the second method 540 is typically quite brief and does not contain functionality required in traditional administrative tool environments, such as parsing code, data validation code, and the like. Thus, system administrators can develop complex administrative tasks without learning a complex programming language.

FIG. 6 is an exemplary data structure 600 for specifying a cmdlet base class 602 from which the cmdlet shown in FIG. 5 is derived. The cmdlet base class 602 includes instructions that provide additional functionality whenever the cmdlet includes a hook statement and a corresponding switch is input on the command line or in the script jointly referred to as command input).

The exemplary data structure 600 includes parameters, such as Boolean parameter verbose 610, whatif 620, and confirm 630. As will be explained below, these parameters correspond to strings that may be entered on the command input. The exemplary data structure 600 may also include a security method 640 that determines whether the task being requested for execution is allowed.

FIG. 7 is another exemplary data structure 700 for specifying a cmdlet. In overview, the data structure 700 provides a means for clearly expressing a contract between the administrative tool framework and the cmdlet. Similar to data structure 500, data structure 700 is a public class that derives from a cmdlet class 704. The software developer specifies a cmdletDeclaration 702 that associates a noun/verb pair, such as "get/process" and "format/table", with the cmdlet 700. The noun/verb pair is registered within the administrative tool environment. The verb or the noun may be implicit in the cmdlet name. Also, similar to data structure 500, data structure 700 may include one or more public members (e.g., Name 730, Recurse 732), which may be associated with the one or more directives 520-526 described in conjunction with data structure 500.

However, in this exemplary data structure 700, each of the expected input parameters 730 and 732 is associated with an input attribute 731 and 733, respectively. The input attributes 731 and 733 specifying that the data for its respective parameter 730 and 732 should be obtained from the command line. Thus, in this exemplary data structure 700, there are not any expected input parameters that are populated from a pipelined object that has been emitted by another cmdlet. Thus, data structure 700 does not override the first method (e.g., StartProcessing) or the second method (e.g., ProcessRecord) which are provided by the cmdlet base class.

The data structure 700 may also include a private member 740 that is not recognized as an input parameter. The private member 740 may be used for storing data that is generated based on one of the directives.

Thus, as illustrated in data structure 700, through the use of declaring public properties and directives within a specific cmdlet class, cmdlet developers can easily specify a grammar for the expected input parameters to their cmdlets and specify processing that should be performed on the expected input parameters without requiring the cmdlet developers to generate any of the underlying logic. Data structure 700 illustrates a direct association between the cmdlet and the grammar mechanism. As mentioned above, this associated may also be indirect, such as by specifying the expected parameter definitions within an external source, such as an XML document.

The exemplary process flows within the administrative tool environment are now described.

Exemplary Host Processing Flow

Figure 8:
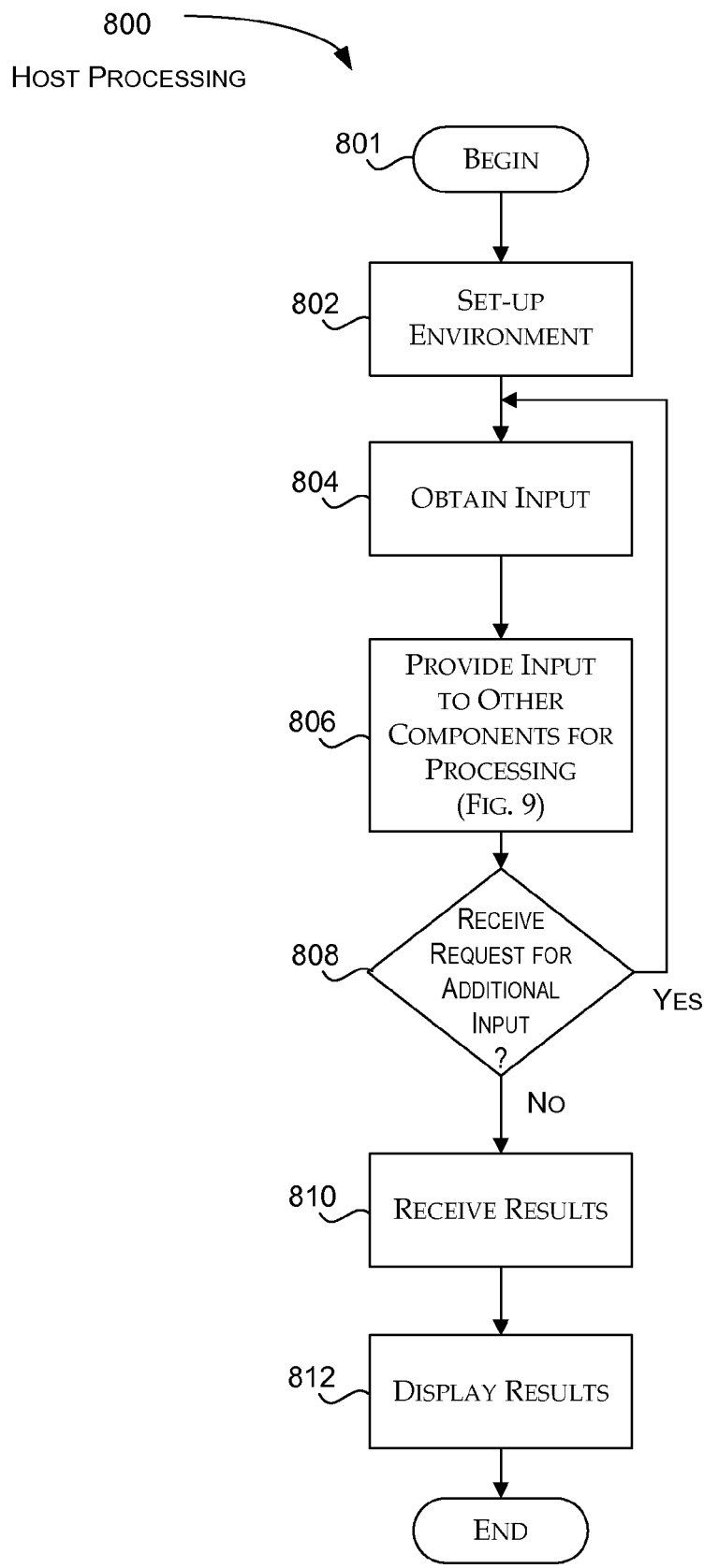
FIG. 8 is a logical flow diagram illustrating an exemplary process for host processing that is performed within the administrative tool framework shown in FIG. 2.

FIG. 8 is a logical flow diagram illustrating an exemplary process for host processing that is performed within the administrative tool framework shown in FIG. 2. The process 800 begins at block 801, where a request has been received to initiate the administrative tool environment for a specific application. The request may have been sent locally through keyboard input, such as selecting an application icon, or remotely through the web services interface of a different computing device. For either scenario, processing continues to block 802.

At block 802, the specific application (e.g., host program) on the "target" computing device sets up its environment. This includes determining which subsets of cmdlets (e.g., management cmdlets 232, non-management cmdlets 234, and host cmdlets 218) are made available to the user. Typically, the host program will make all the non-management cmdlets 234 available and its own host cmdlets 218 available. In addition, the host program will make a subset of the management cmdlets 234 available, such as cmdlets dealing with processes, disk, and the like. Thus, once the host program makes the subsets of cmdlets available, the administrative tool framework is effectively embedded within the corresponding application. Processing continues to block 804.

At block 804, input is obtained through the specific application. As mentioned above, input may take several forms, such as command lines, scripts, voice, GUI, and the like. For example, when input is obtained via a command line, the input is retrieve from the keystrokes entered on a keyboard. For a GUI host, a string is composed based on the GUI. Processing continues at block 806.

At block 806, the input is provided to other components within the administrative tool framework for processing. The host program may forward the input directly to the other components, such as the parser. Alternatively, the host program may forward the input via one of its host cmdlets. The host cmdlet may convert its specific type of input (e.g., voice) into a type of input (e.g., text string, script) that is recognized by the administrative tool framework. For example, voice input may be converted to a script or command line string depending on the content of the voice input. Because each host program is responsible for converting their type of input to an input recognized by the administrative tool framework, the administrative tool framework can accept input from any number of various host components. In addition, the administrative tool framework provides a rich set of utilities that perform conversions between data types when the input is forwarded via one of its cmdlets. Processing performed on the input by the other components is described below in conjunction with several other figures. Host processing continues at decision block 808.

At decision block 808, a determination is made whether a request was received for additional input. This may occur if one of the other components responsible for processing the input needs additional information from the user in order to complete its processing. For example, a password may be required to access certain data, confirmation of specific actions may be needed, and the like. For certain types of host programs (e.g., voice mail), a request such as this may not be appropriate. Thus, instead of querying the user for additional information, the host program may serialize the state, suspend the state, and send a notification so that at a later time the state may be resumed and the execution of the input be continued. In another variation, the host program may provide a default value after a predetermined time period. If a request for additional input is received, processing loops back to block 804, where the additional input is obtained. Processing then continues through blocks 806 and 808 as described above. If no request for additional input is received and the input has been processed, processing continues to block 810.

At block 810, results are received from other components within the administrative tool framework. The results may include error messages, status, and the like. The results are in an object form, which is recognized and processed by the host cmdlet within the administrative tool framework. As will be described below, the code written for each host cmdlet is very minimal. Thus, a rich set of output may be displayed without requiring a huge investment in development costs. Processing continues at block 812.

At block 812, the results may be viewed. The host cmdlet converts the results to the display style supported by the host program. For example, a returned object may be displayed by a GUI host program using a graphical depiction, such as an icon, barking dog, and the like. The host cmdlet provides a default format and output for the data. The default format and output may utilize the exemplary output processing cmdlets described below in conjunction with FIGS. 19-23. After the results are optionally displayed, the host processing is complete.

Exemplary Process Flows for Handling Input

Figure 9:
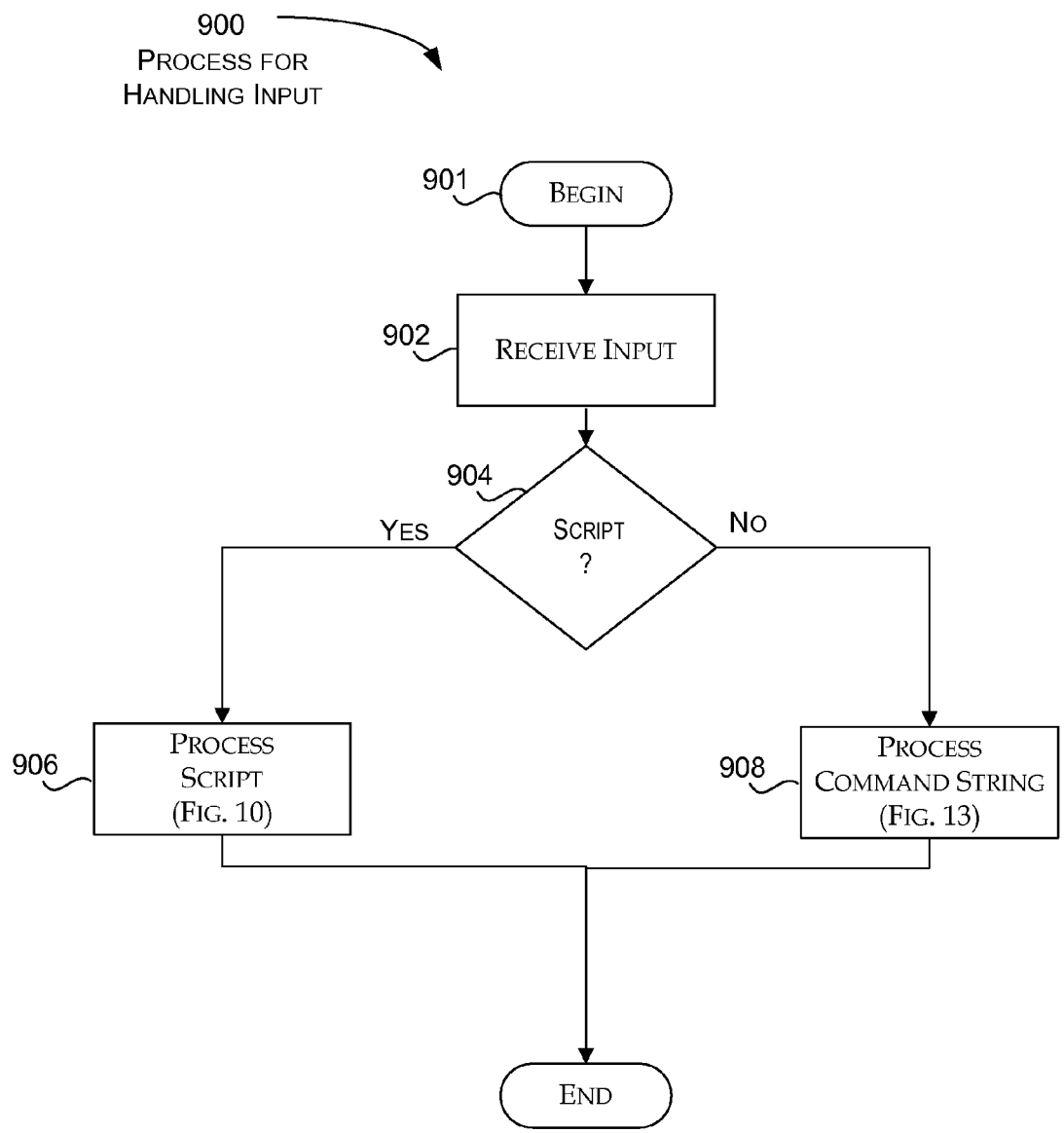
FIG. 9 is a logical flow diagram illustrating an exemplary process for handling input that is performed within the administrative tool framework shown in FIG. 2.

FIG. 9 is a logical flow diagram illustrating an exemplary process for handling input that is performed within the administrative tool framework shown in FIG. 2. Processing begins at block 901 where input has been entered via a host program and forwarded to other components within the administrative tool framework. Processing continues at block 902.

At block 902, the input is received from the host program. In one exemplary administrative tool framework, the input is received by the parser, which deciphers the input and directs the input for further processing. Processing continues at decision block 904.

At decision block 904, a determination is made whether the input is a script. The input may take the form of a script or a string representing a command line (hereinafter, referred to as a "command string"). The command string may represent one or more cmdlets pipelined together. Even though the administrative tool framework supports several different hosts, each host provides the input as either a script or a command string for processing. As will be shown below, the interaction between scripts and command strings is recursive in nature. For example, a script may have a line that invokes a cmdlet. The cmdlet itself may be a script.

Thus, at decision block 904, if the input is in a form of a script, processing continues at block 906, where processing of the script is performed. Otherwise, processing continues at block 908, where processing of the command string is performed. Once the processing performed within either block 906 or 908 is completed, processing of the input is complete.

Exemplary Processing of Scripts

Figure 10:
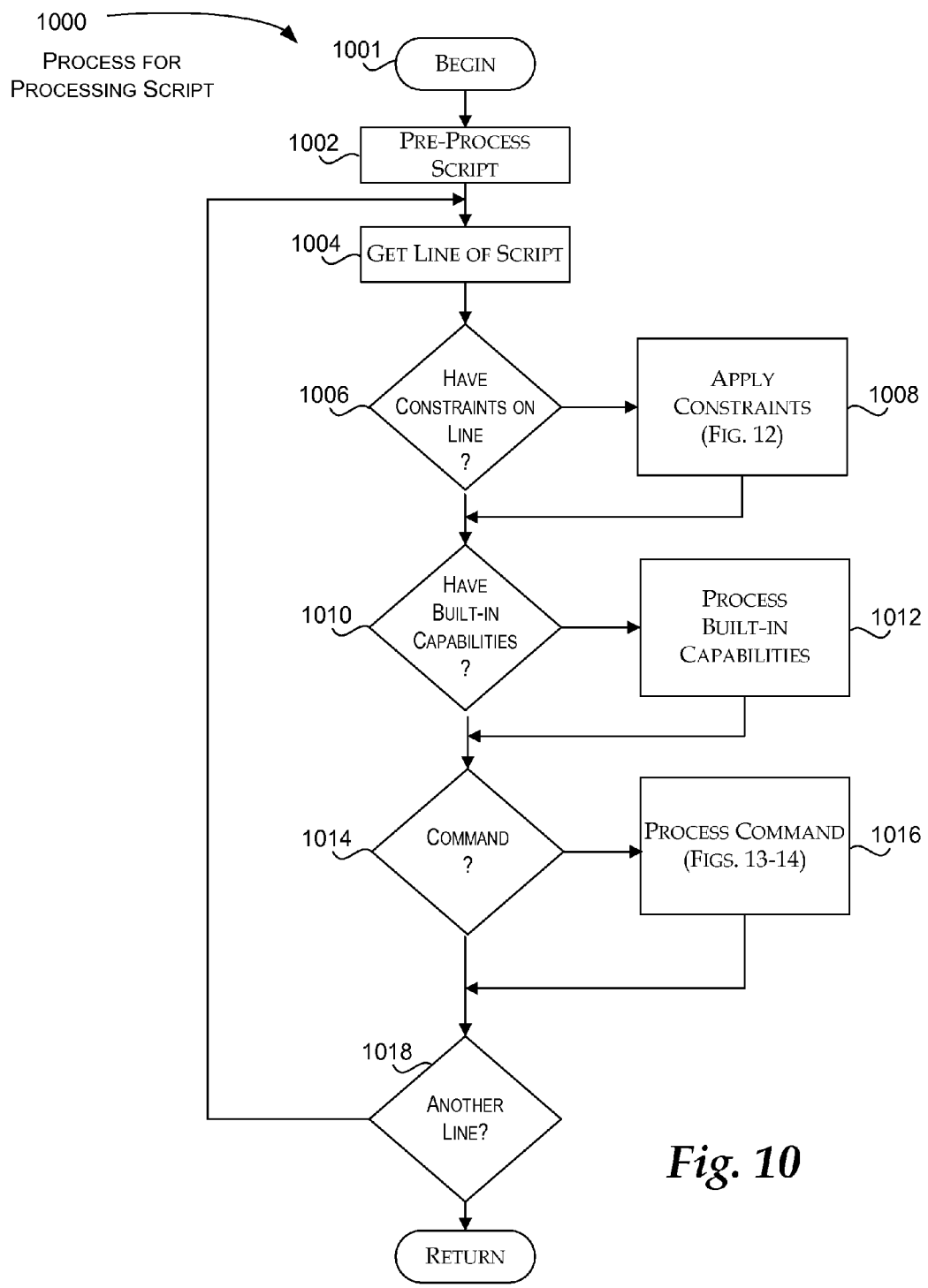
FIG. 10 is a logical flow diagram illustrating a process for processing scripts suitable for use within the process for handling input shown in FIG. 9.
Figure 11:
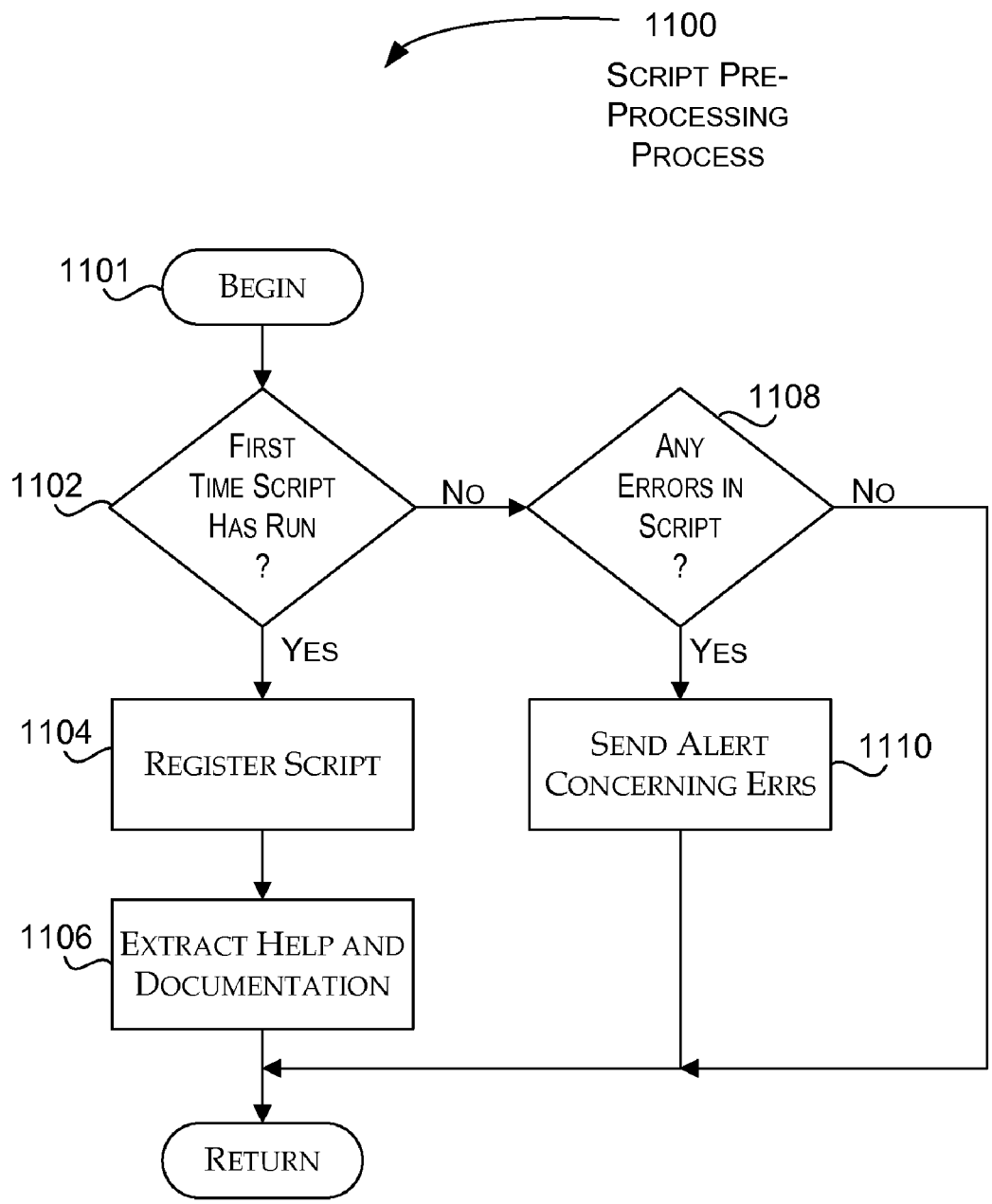
FIG. 11 is a logical flow diagram illustrating a script pre-processing process suitable for use within the script processing process shown in FIG. 10.

FIG. 10 is a logical flow diagram illustrating a process for processing a script suitable for use within the process for handling input shown in FIG. 9. The process begins at block 1001, where the input has been identified as a script. The script engine and parser communicate with each other to perform the following functions. Processing continues at block 1002.

At block 1002, pre-processing is performed on the script. Briefly, turning to FIG. 11, a logical flow diagram is shown that illustrates a script pre-processing process 1100 suitable for use within the script processing process 1000. Script pre-processing begins at block 1101 and continues to decision block 1102.

At decision block 1102, a determination is made whether the script is being run for the first time. This determination may be based on information obtained from a registry or other storage mechanism. The script is identified from within the storage mechanism and the associated data is reviewed. If the script has not run previously, processing continues at block 1104.

At block 1104, the script is registered in the registry. This allows information about the script to be stored for later access by components within the administrative tool framework. Processing continues at block 1106.

At block 1106, help and documentation are extracted from the script and stored in the registry. Again, this information may be later accessed by components within the administrative tool framework. The script is now ready for processing and returns to block 1004 in FIG. 10.

Returning to decision block 1102, if the process concludes that the script has run previously, processing continues to decision block 1108. At decision block 1108, a determination is made whether the script failed during processing. This information may be obtained from the registry. If the script has not failed, the script is ready for processing and returns to block 1004 in FIG. 10.

However, if the script has failed, processing continues at block 1110. At block 1110, the script engine may notify the user through the host program that the script has previously failed. This notification will allow a user to decide whether to proceed with the script or to exit the script. As mentioned above in conjunction with FIG. 8, the host program may handle this request in various ways depending on the style of input (e.g., voice, command line). Once additional input is received from the user, the script either returns to block 1004 in FIG. 10 for processing or the script is aborted.

Returning to block 1004 in FIG. 10, a line from the script is retrieved. Processing continues at decision block 1006. At decision block 1006, a determination is made whether the line includes any constraints. A constraint is detected by a pre-defined begin character (e.g., a bracket "["") and a corresponding end character (e.g., a close bracket "]"). If the line includes constraints, processing continues to block 1008.

Figure 12:
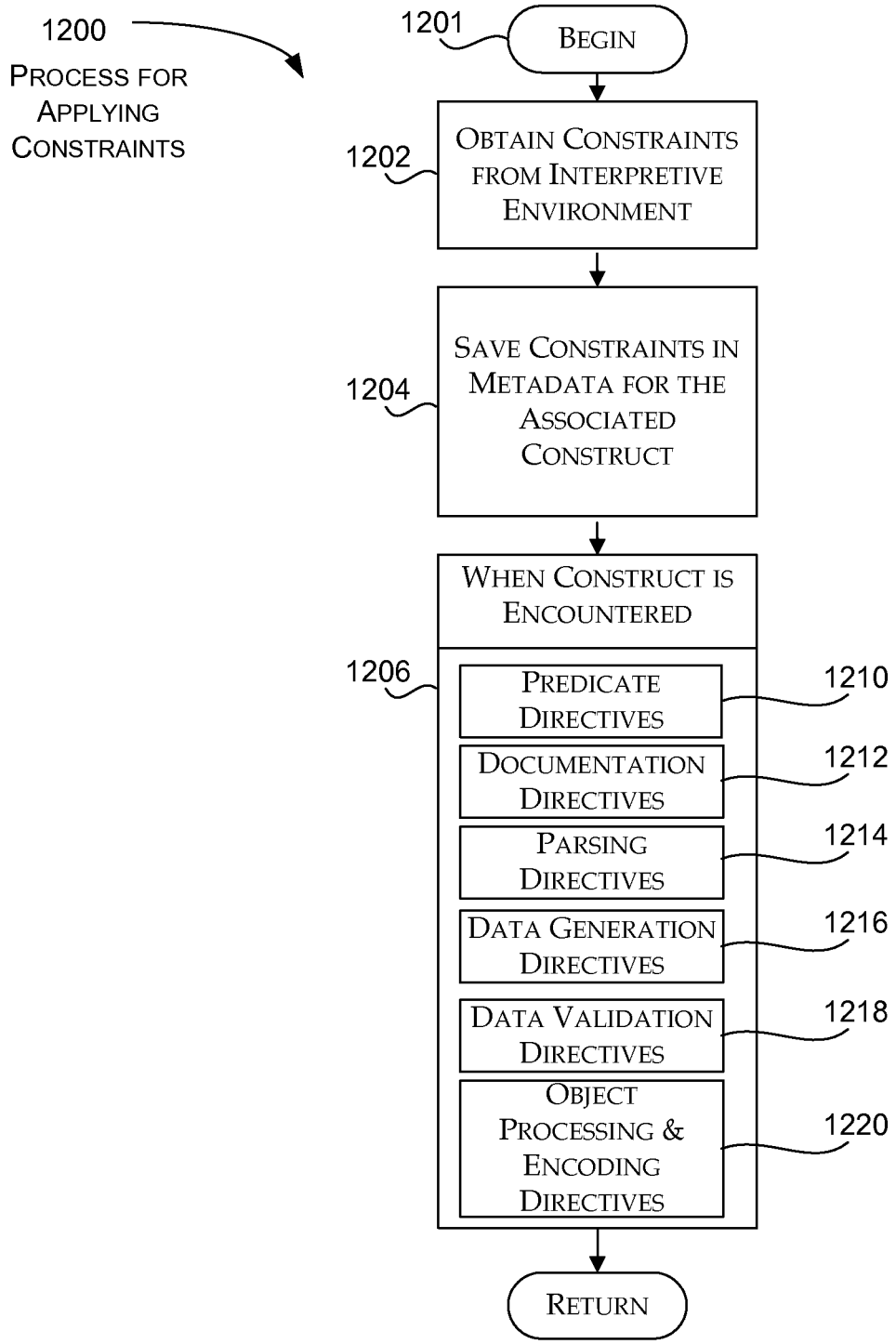
FIG. 12 is a logical flow diagram illustrating a process for applying constraints suitable for use within the script processing process shown in FIG. 10.

At block 1008, the constraints included in the line are applied. In general, the constraints provide a mechanism within the administrative tool framework to specify a type for a parameter entered in the script and to specify validation logic which should be performed on the parameter. The constraints are not only applicable to parameters, but are also applicable to any type of construct entered in the script, such as variables. Thus, the constraints provide a mechanism within an interpretive environment to specify a data type and to validate parameters. In traditional environments, system administrators are unable to formally test parameters entered within a script. An exemplary process for applying constraints is illustrated in FIG. 12.

At decision block 1010, a determination is made whether the line from the script includes built-in capabilities. Built-in capabilities are capabilities that are not performed by the core engine. Built-in capabilities may be processed using cmdlets or may be processed using other mechanisms, such as in-line functions. If the line does not have built-in capabilities, processing continues at decision block 1014. Otherwise, processing continues at block 1012.

At block 1012, the built-in capabilities provided on the line of the script are processed. Example built-in capabilities may include execution of control structures, such as "if" statements, "for" loops, switches, and the like. Built-in capabilities may also include assignment type statements (e.g., a=3). Once the built-in capabilities have been processed, processing continues to decision block 1014.

At decision block 1014, a determination is made whether the line of the script includes a command string. The determination is based on whether the data on the line is associated with a command string that has been registered and with a syntax of the potential cmdlet invocation. As mentioned above, the processing of command strings and scripts may be recursive in nature because scripts may include command strings and command strings may execute a cmdlet that is a script itself. If the line does not include a command string, processing continues at decision block 1018. Otherwise, processing continues at block 1016.

At block 1016, the command string is processed. In overview, the processing of the command string includes identifying a cmdlet class by the parser and passing the corresponding cmdlet object to the core engine for execution. The command string may also include a pipelined command string that is parsed into several individual cmdlet objects and individually processed by the core engine. One exemplary process for processing command strings is described below in conjunction with FIG. 14. Once the command string is processed, processing continues at decision block 1018.

At decision block 1018, a determination is made whether there is another line in the script. If there is another line in the script, processing loops back to block 1004 and proceeds as described above in blocks 1004-1016. Otherwise, processing is complete.

An exemplary process for applying constraints in block 1008 is illustrated in FIG. 12. The process begins at block 1201 where a constraint is detected in the script or in the command string on the command line. When the constraint is within a script, the constraints and the associated construct may occur on the same line or on separate lines. When the constraint is within a command string, the constraint and the associated construct occur before the end of line indicator (e.g., enter key). Processing continues to block 1202.

At block 1202, constraints are obtained from the interpretive environment. In one exemplary administrative tool environment, the parser deciphers the input and determines the occurrence of constraints. Constraints may be from one of the following categories: predicate directive, parsing directive, data validation directive, data generation directive, processing directive, encoding directive, and documentation directive. For one exemplary parsing syntax, the directives are surrounded by square brackets and describe the construct that follows them. The construct may be a function, a variable, a script, or the like.

As will be described below, through the use of directives, script authors are allowed to easily type and perform processing on the parameters within the script or command line (i.e., an interpretive environment) without requiring the script authors to generate any of the underlying logic. Processing continues to block 1204.

At block 1204, the constraints that are obtained are stored in the metadata for the associated construct. The associated construct is identified as being the first non-attribution token after one or more attribution tokens (tokens that denote constraints) have been encountered. Processing continues to block 1206.

At block 1206, whenever the construct is encountered within the script or in the command string, the constraints defined within the metadata are applied to the construct. The constraints may include data type, predicate directives 1210, documentation directives 1212, parsing directives 1214, data generation directives 1216, data validation directives 1218, and object processing and encoding directives 1220. Constraints specifying data types may specify any data type supported by the system on which the administrative tool framework is running. Predicate directives 1210 are directives that indicate whether processing should occur. Thus, predicate directives 1210 ensure that the environment is correct for execution. For example, a script may include the following predicate directive:

[PredicateScript("isInstalled","ApplicationZ")].

The predicate directive ensures that the correct application is installed on the computing device before running the script. Typically, system environment variables may be specified as predicate directives. Exemplary directives from directive types 1212-1220 are illustrated in Tables 1-5. Processing of the script is then complete.

Thus, the present process for applying types and constraints within an interpretive environment, allows system administrators to easily specify a type, specify validation requirements, and the like without having to write the underlying logic for performing this processing. The following is an example of the constraint processing performed on a command string specified as follows:

[Integer] [ValidationRange(3,5)] $a=4.

There are two constraints specified via attribution tokens denoted by "[ ]". The first attribution token indicates that the variable is a type integer and a second attribution token indicates that the value of the variable $a must be between 3 and 5 inclusive. The example command string ensures that if the variable $a is assigned in a subsequent command string or line, the variable $a will be checked against the two constraints. Thus, the following command strings would each result in an error:

$a=231
$a="apple"
$a=$(get/location).

The constraints are applied at various stages within the administrative tool framework. For example, applicability directives, documentation directives, and parsing guideline directives are processed at a very early stage within the parser. Data generation directives and validation directives are processed in the engine once the parser has finished parsing all the input parameters.

The following tables illustrate representative directives for the various categories, along with an explanation of the processing performed by the administrative tool environment in response to the directive.

TABLE 1

Applicability Directives

| Name | Description |
| --- | --- |
| PrerequisiteMachineRoleAttribute | Informs shell whether element is to be used only in certain machine roles (e.g., File Server, Mail Server). |
| PrerequisiteUserRoleAttribute | Informs shell whether element is to be used only in certain user roles (e.g., Domain Administrator, Backup Operator). |
| PrerequisiteScriptAttribute | Informs the shell this script will be run before excuting the actual command or parameter. Can be used for parameter validation |
| PrerequisiteUITypeAttribute | This is used to check the User interface available before excuting |

TABLE 2

Parsing Guideline Directives

| Name | Description |
| --- | --- |
| ParsingParameterPositionAttribute | Maps unqualified parameters based on position. |
| ParsingVariableLengthParameterListAttribute | Maps parameters not having a Parsing ParameterPosition attribute. |
| ParsingDisallowInteractionAttribute | Specifies action when number of parameters is less than required number. |
| ParsingRequireInteractionAttribute | Specifies that parameters are obtained through interaction. |
| ParsingHiddenElementAttribute | Makes parameter invisible to end user. |
| ParsingMandatoryParameterAttribute | Specifies that the parameter is required. |
| ParsingPasswordParameterAttribute | Requires special handling of parameter. |
| ParsingPromptStringAttribute | Specifies a prompt for the parameter. |
| ParsingDefaultAnswerAttribute | Specifies default answer for parameter. |
| ParsingDefaultAnswerScriptAttribute | Specifies action to get default answer for parameter. |
| ParsingDefaultValueAttribute | Specifies default value for parameter. |
| ParsingDefaultValueScriptAttribute | Specifies action to get default value for parameter. |
| ParsingParameterMappingAttribute | Specifies a way to group parameters |
| ParsingParameterDeclarationAttribute | This defines that the filed is a parameter |
| ParsingAllowPipelineInputAttribute | Defines the parameter can be populated from the pipeline |

TABLE 3

Documentation Directives

| Name | Description |
| --- | --- |
| DocumentNameAttribute | Provides a Name to refer to elements for interaction or help. |
| DocumentShortDescriptionAttribute | Provides brief description of element. |
| DocumentLongDescriptionAttribute | Provides detailed description of element. |
| DocumentExampleAttribute | Provides example of element. |
| DocumentSeeAlsoAttribute | Provides a list of related elements. |
| DocumentSynopsisAttribute | Provides documentation information for element. |

TABLE 4

Data Validation Directives

| Name | Description |
| --- | --- |
| ValidationRangeAttribute | Specifies that parameter must be within certain range. |
| ValidationSetAttribute | Specifies that parameter must be within certain collection. |
| ValidationPatternAttribute | Specifies that parameter must fit a certain pattern. |
| ValidationLengthAttribute | Specifies the strings must be within size range. |
| ValidationTypeAttribute | Specifies that parameter must be of certain type. |
| ValidationCountAttributue | Specifies that input items must be of a certain number. |
| ValidationFileAttribute | Specifies certain properties for a file. |
| ValidationFileAttributesAttribute | Specifies certain properties for a file. |
| ValidationFileSizeAttribute | Specifies that files must be within specified range. |
| ValidationNetworkAttribute | Specifies that given Network Entity supports certain properties. |
| ValidationScriptAttribute | Specifies conditions to evaluate before using element. |
| ValidationMethodAttribute | Specifies conditions to evaluate before using element. |

TABLE 5

Processing and Encoding Directives

| Name | Description |
| --- | --- |
| ProcessingTrimStringAttribute | Specifies size limit for strings. |
| ProcessingTrimCollectionAttribute | Specifies size limit for collection. |
| EncodingTypeCoercionAttribute | Specifies Type that objects are to be encoded. |
| ExpansionWildcardsAttribute | Provides a mechanism to allow globbing |

When the exemplary administrative tool framework is operating within the .NET™ Framework, each category has a base class that is derived from a basic category class (e.g., CmdAttribute). The basic category class derives from a System.Attribute class. Each category has a pre-defined function (e.g., attrib.func( )) that is called by the parser during category processing. The script author may create a custom category that is derived from a custom category class (e.g., CmdCustomAttribute). The script author may also extend an existing category class by deriving a directive class from the base category class for that category and override the pre-defined function with their implementation. The script author may also override directives and add new directives to the pre-defined set of directives.

The order of processing of these directives may be stored in an external data store accessible by the parser. The administrative tool framework looks for registered categories and calls a function (e.g., ProcessCustomDirective) for each of the directives in that category. Thus, the order of category processing may be dynamic by storing the category execution information in a persistent store. At different processing stages, the parser checks in the persistent store to determine if any metadata category needs to be executed at that time. This allows categories to be easily deprecated by removing the category entry from the persistent store.

Exemplary Processing of Command Strings

Figure 13:
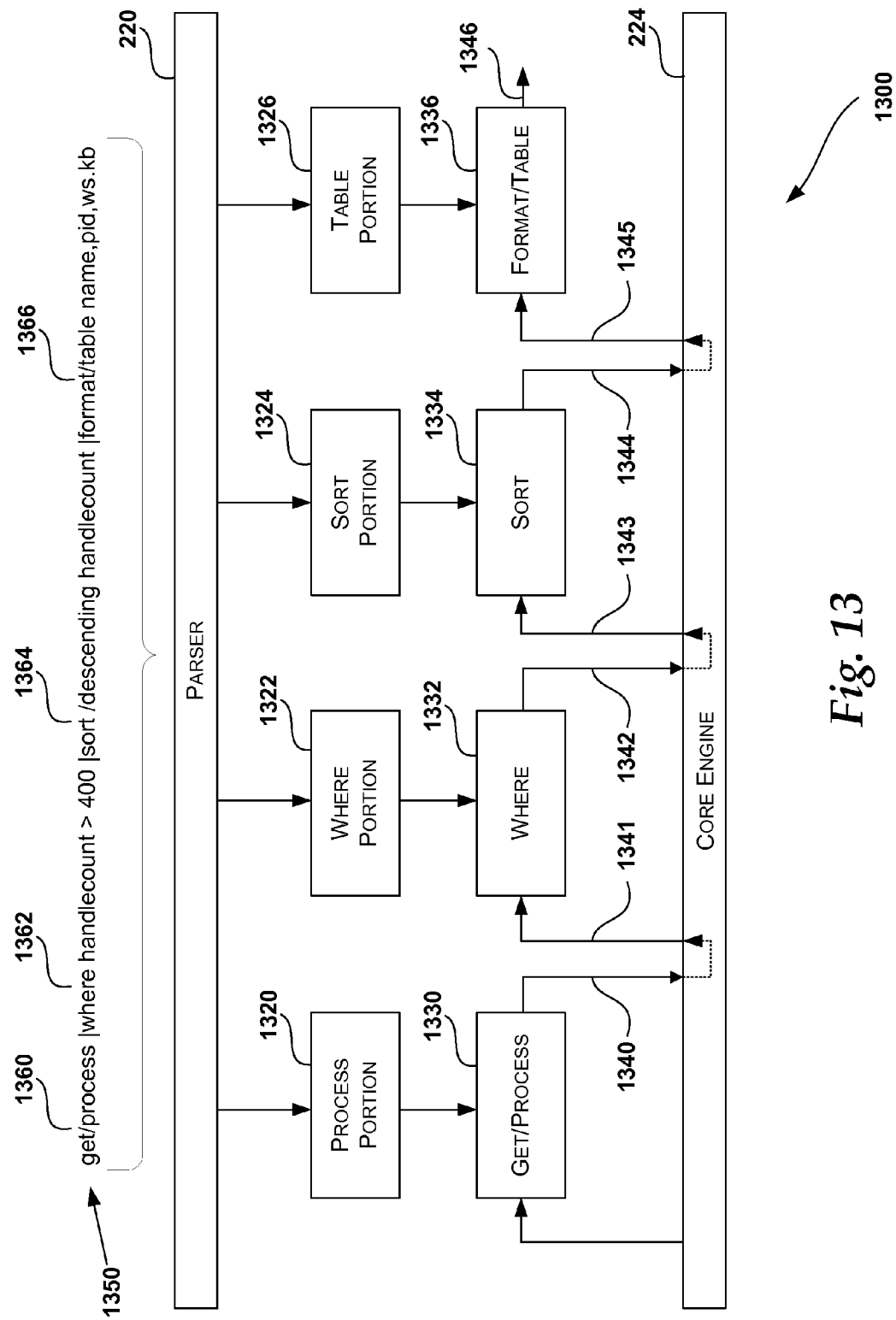
FIG. 13 is a functional flow diagram illustrating the processing of a command string in the administrative tool framework shown in FIG. 2.

One exemplary process for processing command strings is now described. FIG. 13 is a functional flow diagram graphically illustrating the processing of a command string 1350 through a parser 220 and a core engine 224 within the administrative tool framework shown in FIG. 2. The exemplary command string 1350 pipelines several commands (i.e., process command 1360, where command 1362, sort command 1364, and table command 1366). The command line 1350 may pass input parameters to any of the commands (e.g., "handlecount>400" is passed to the where command 1362). One will note that the process command 1360 does not have any associated input parameters.

In the past, each command was responsible for parsing the input parameters associated with the command, determining whether the input parameters were valid, and issuing error messages if the input parameters were not valid. Because the commands were typically written by various programmers, the syntax for the input parameters on the command line was not very consistent. In addition, if an error occurred, the error message, even for the same error, was not very consistent between the commands.

For example, in a UNIX environment, an "is" command and a "ps" command have many inconsistencies between them. While both accept an option "-w", the "-w" option is used by the "is" command to denote the width of the page, while the "-w" option is used by the "ps" command to denote print wide output (in essence, ignoring page width). The help pages associated with the "is" and the "ps" command have several inconsistencies too, such as having options bolded in one and not the other, sorting options alphabetically in one and not the other, requiring some options to have dashes and some not.

The present administrative tool framework provides a more consistent approach and minimizes the amount of duplicative code that each developer must write. The administrative tool framework 200 provides a syntax (e.g., grammar), a corresponding semantics (e.g., a dictionary), and a reference model to enable developers to easily take advantage of common functionality provided by the administrative tool framework 200.

Before describing the present invention any further, definitions for additional terms appearing through-out this specification are provided. Input parameter refers to input-fields for a cmdlet. Argument refers to an input parameter passed to a cmdlet that is the equivalent of a single string in the argv array or passed as a single element in a cmdlet object. As will be described below, a cmdlet provides a mechanism for specifying a grammar. The mechanism may be provided directly or indirectly. An argument is one of an option, an option-argument, or an operand following the command-name. Examples of arguments are given based on the following command line:

findstr/i/d:\winnt;\winnt\system32 aa*b*.ini.

In the above command line, "findstr" is argument 0, "/i" is argument 1, "/d:\winnt;\winnt\system32" is argument 2, "aa*b" is argument 3, and "*.ini" is argument 4. An "option" is an argument to a cmdlet that is generally used to specify changes to the program's default behavior. Continuing with the example command line above, "/i" and "/d" are options. An "option-argument" is an input parameter that follows certain options. In some cases, an option-argument is included within the same argument string as the option. In other cases, the option-argument is included as the next argument. Referring again to the above command line, "winnt;\winnt\system32" is an option-argument. An "operand" is an argument to a cmdlet that is generally used as an object supplying information to a program necessary to complete program processing. Operands generally follow the options in a command line. Referring to the example command line above again, "aa*b" and "*.ini" are operands. A "parsable stream" includes the arguments.

Referring to FIG. 13, parser 220 parses a parsable stream (e.g., command string 1350) into constituent parts 1320-1326 (e.g., where portion 1322). Each portion 1320-1326 is associated with one of the cmdlets 1330-1336. Parser 220 and engine 224 perform various processing, such as parsing, parameter validation, data generation, parameter processing, parameter encoding, and parameter documentation. Because parser 220 and engine 224 perform common functionality on the input parameters on the command line, the administrative tool framework 200 is able to issue consistent error messages to users.

As one will recognize, the executable cmdlets 1330-1336 written in accordance with the present administrative tool framework require less code than commands in prior administrative environments. Each executable cmdlet 1330-1336 is identified using its respective constituent part 1320-1326. In addition, each executable cmdlet 1330-1336 outputs objects (represented by arrows 1340, 1342, 1344, and 1346) which are input as input objects (represented by arrows 1341, 1343, and 1345) to the next pipelined cmdlet. These objects may be input by passing a reference (e.g., handle) to the object. The executable cmdlets 1330-1336 may then perform additional processing on the objects that were passed in.

Figure 14:
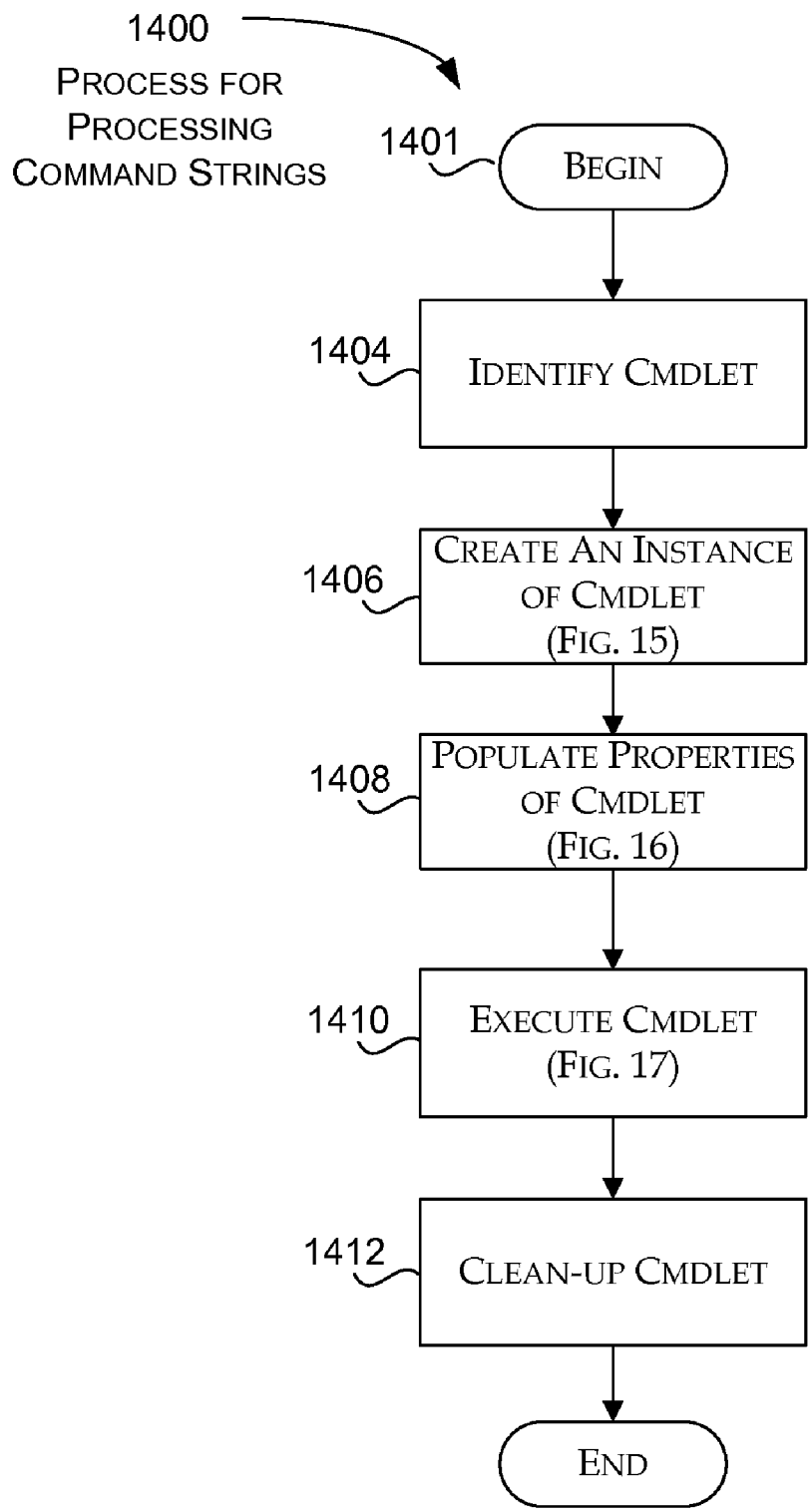
FIG. 14 is a logical flow diagram illustrating a process for processing commands strings suitable for use within the process for handling input shown in FIG. 9.

FIG. 14 is a logical flow diagram illustrating in more detail the processing of command strings suitable for use within the process for handling input shown in FIG. 9. The command string processing begins at block 1401, where either the parser or the script engine identified a command string within the input. In general the core engine performs set-up and sequencing of the data flow of the cmdlets. The set-up and sequencing for one cmdlet is described below, but is applicable to each cmdlet in a pipeline. Processing continues at block 1404.

At block 1404, a cmdlet is identified. The identification of the cmdlet may be thru registration. The core engine determines whether the cmdlet is local or remote. The cmdlet may execute in the following locations: 1) within the application domain of the administrative tool framework; 2) within another application domain of the same process as the administrative tool framework; 3) within another process on the same computing device; or 4) within a remote computing device. The communication between cmdlets operating within the same process is through objects. The communication between cmdlets operating within different processes is through a serialized structured data format. One exemplary serialized structured data format is based on the extensible markup language (XML). Processing continues at block 1406.

At block 1406, an instance of the cmdlet object is created. An exemplary process for creating an instance of the cmdlet is described below in conjunction with FIG. 15. Once the cmdlet object is created, processing continues at block 1408.

At block 1408, the properties associated with the cmdlet object are populated. As described above, the developer declares properties within a cmdlet class or within an external source. Briefly, the administrative tool framework will decipher the incoming object(s) to the cmdlet instantiated from the cmdlet class based on the name and type that is declared for the property. If the types are different, the type may be coerced via the extended data type manager. As mentioned earlier, in pipelined command strings, the output of each cmdlet may be a list of handles to objects. The next cmdlet may inputs this list of object handles, performs processing, and passes another list of object handles to the next cmdlet. In addition, as illustrated in FIG. 7, input parameters may be specified as coming from the command line. One exemplary method for populating properties associated with a cmdlet is described below in conjunction with FIG. 16. Once the cmdlet is populated, processing continues at block 1410.

At block 1410, the cmdlet is executed. In overview, the processing provided by the cmdlet is performed at least once, which includes processing for each input object to the cmdlet. Thus, if the cmdlet is the first cmdlet within a pipelined command string, the processing is executed once. For subsequent cmdlets, the processing is executed for each object that is passed to the cmdlet. One exemplary method for executing cmdlets is described below in conjunction with FIG. 5. When the input parameters are only coming from the command line, execution of the cmdlet uses the default methods provided by the base cmdlet case. Once the cmdlet is finished executing, processing proceeds to block 1412.

At block 1412, the cmdlet is cleaned-up. This includes calling the destructor for the associated cmdlet object which is responsible for de-allocating memory and the like. The processing of the command string is then complete.

Exemplary Process for Creating a Cmdlet Object

Figure 15:
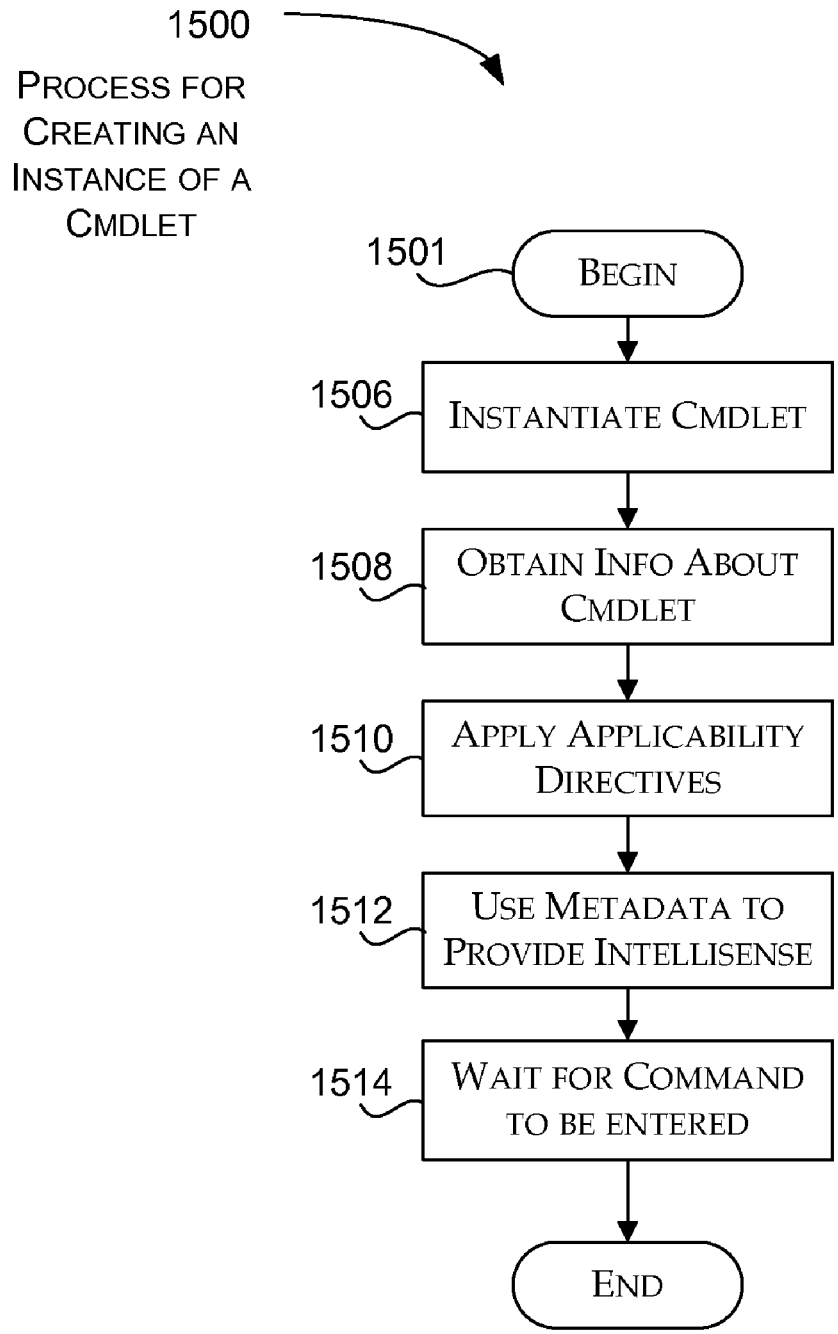
FIG. 15 is a logical flow diagram illustrating an exemplary process for creating an instance of a cmdlet suitable for use within the processing of command strings shown in FIG. 14.

FIG. 15 is a logical flow diagram illustrating an exemplary process for creating a cmdlet object suitable for use within the processing of command strings shown in FIG. 14. At this point, the cmdlet data structure has been developed and attributes and expected input parameters have been specified. The cmdlet has been compiled and has been registered. During registration, the class name (i.e., cmdlet name) is written in the registration store and the metadata associated with the cmdlet has been stored. The process 1500 begins at block 1501, where the parser has received input (e.g., keystrokes) indicating a cmdlet. The parser may recognize the input as a cmdlet by looking up the input from within the registry and associating the input with one of the registered cmdlets. Processing proceeds to block 1504.

At block 1504, metadata associated with the cmdlet object class is read. The metadata includes any of the directives associated with the cmdlet. The directives may apply to the cmdlet itself or to one or more of the parameters. During cmdlet registration, the registration code registers the metadata into a persistent store. The metadata may be stored in an XML file in a serialized format, an external database, and the like. Similar to the processing of directives during script processing, each category of directives is processed at a different stage. Each metadata directive handles its own error handling. Processing continues at block 1506.

At block 1506, a cmdlet object is instantiated based on the identified cmdlet class. Processing continues at block 1508.

At block 1508, information is obtained about the cmdlet. This may occur through reflection or other means. The information is about the expected input parameters. As mentioned above, the parameters that are declared public (e.g., public string Name 730) correspond to expected input parameters that can be specified in a command string on a command line or provided in an input stream. The administrative tool framework through the extended type manager, described in FIG. 18, provides a common interface for returning the information (on a need basis) to the caller. Processing continues at block 1510.

At block 1510, applicability directives (e.g., Table 1) are applied. The applicability directives insure that the class is used in certain machine roles and/or user roles. For example, certain cmdlets may only be used by Domain Administrators. If the constraint specified in one of the applicability directives is not met, an error occurs. Processing continues at block 1512.

At block 1512, metadata is used to provide intellisense. At this point in processing, the entire command string has not yet been entered. The administrative tool framework, however, knows the available cmdlets. Once a cmdlet has been determined, the administrative tool framework knows the input parameters that are allowed by reflecting on the cmdlet object. Thus, the administrative tool framework may auto-complete the cmdlet once a disambiguating portion of the cmdlet name is provided, and then auto-complete the input parameter once a disambiguating portion of the input parameter has been typed on the command line. Auto-completion may occur as soon as the portion of the input parameter can identify one of the input parameters unambiguously. In addition, auto-completion may occur on cmdlet names and operands too. Processing continues at block 1514.

At block 1514, the process waits until the input parameters for the cmdlet have been entered. This may occur once the user has indicated the end of the command string, such as by hitting a return key. In a script, a new line indicates the end of the command string. This wait may include obtaining additional information from the user regarding the parameters and applying other directives. When the cmdlet is one of the pipelined parameters, processing may begin immediately. Once, the necessary command string and input parameters have been provided, processing is complete.

Exemplary Process for Populating the Cmdlet

Figure 16:
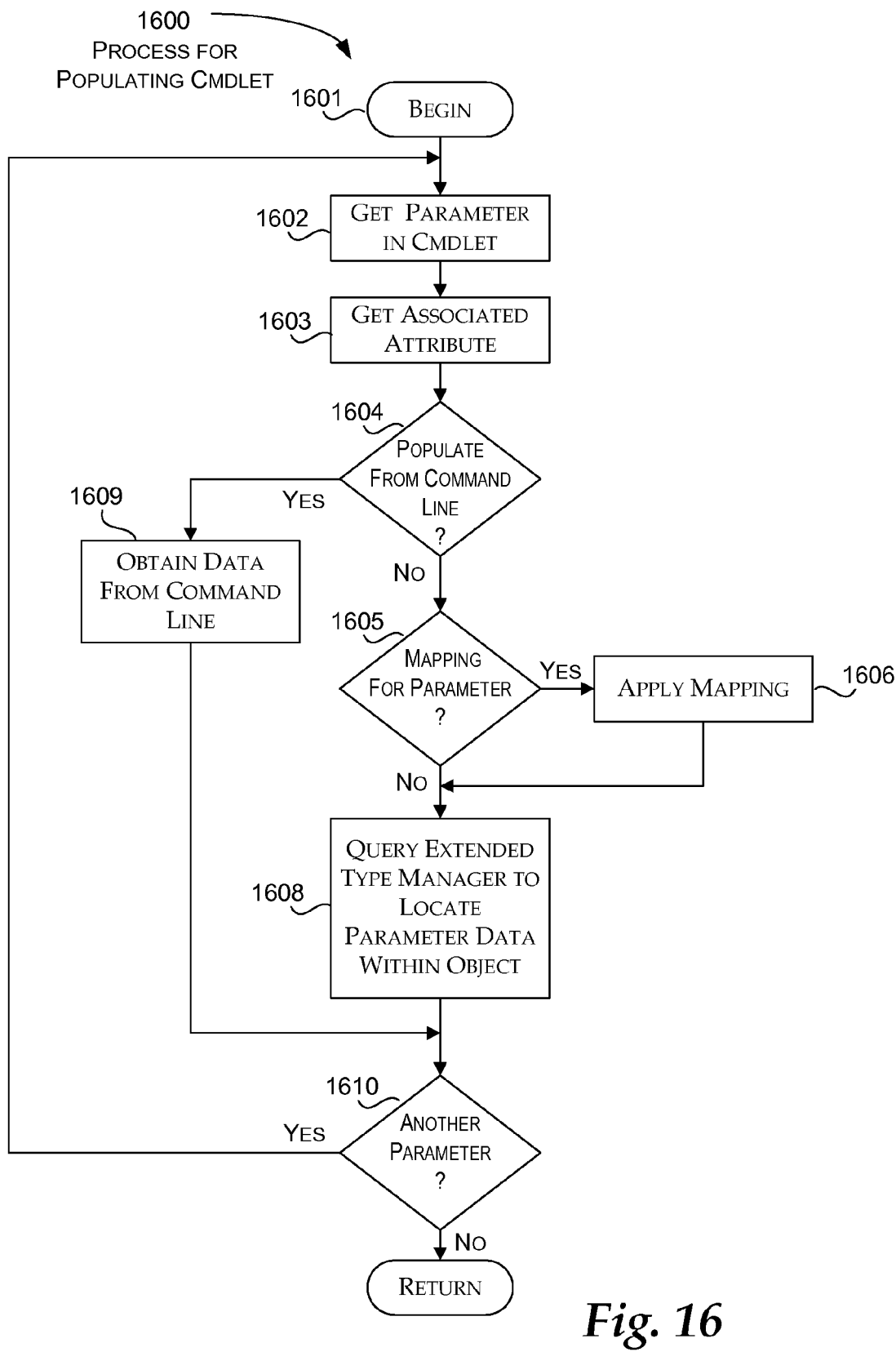
FIG. 16 is a logical flow diagram illustrating an exemplary process for populating properties of a cmdlet suitable for use within the processing of commands shown in FIG. 14.

An exemplary process for populating a cmdlet is illustrated in FIG. 16 and is now described, in conjunction with FIG. 5. In one exemplary administrative tool framework, the core engine performs the processing to populate the parameters for the cmdlet. Processing begins at block 1601 after an instance of a cmdlet has been created. Processing continues to block 1602.

At block 1602, a parameter (e.g., ProcessName) declared within the cmdlet is retrieved. Based on the declaration with the cmdlet, the core engine recognizes that the incoming input objects will provide a property named "ProcessName". If the type of the incoming property is different than the type specified in the parameter declaration, the type will be coerced via the extended type manager. The process of coercing data types is explained below in the subsection entitled "Exemplary Extended Type Manager Processing." Processing continues to block 1603.

At block 1603, an attribute associated with the parameter is obtained. The attribute identifies whether the input source for the parameter is the command line or whether it is from the pipeline. Processing continues to decision block 1604.

At decision block 1604, a determination is made whether the attribute specifies the input source as the command line. If the input source is the command line, processing continues at block 1609. Otherwise, processing continues at decision block 1605.

At decision block 1605, a determination is made whether the property name specified in the declaration should be used or whether a mapping for the property name should be used. This determination is based on whether the command input specified a mapping for the parameter. The following line illustrates an exemplary mapping of the parameter "ProcessName" to the "foo" member of the incoming object:

$ get/process| where han*-gt 500| stop/process-ProcessName<-foo. Processing continues at block 1606.

At block 1606, the mapping is applied. The mapping replaces the name of the expected parameter from "ProcessName" to "foo", which is then used by the core engine to parse the incoming objects and to identify the correct expected parameter. Processing continues at block 1608.

At block 1608, the extended type manager is queried to locate a value for the parameter within the incoming object. As explain in conjunction with the extended type manager, the extended type manager takes the parameter name and uses reflection to identify a parameter within the incoming object with parameter name. The extended type manager may also perform other processing for the parameter, if necessary. For example, the extended type manager may coerce the type of data to the expected type of data through a conversion mechanism described above. Processing continues to decision block 1610.

Referring back to block 1609, if the attribute specifies that the input source is the command line, data from the command line is obtained. Obtaining the data from the command line may be performed via the extended type manager. Processing then continues to decision block 1610.

At decision block 1610, a determination is made whether there is another expected parameter. If there is another expected parameter, processing loops back to block 1602 and proceeds as described above. Otherwise, processing is complete and returns.

Thus, as shown, cmdlets act as a template for shredding incoming data to obtain the expected parameters. In addition, the expected parameters are obtained without knowing the type of incoming object providing the value for the expected parameter. This is quite different than traditional administrative environments. Traditional administrative environments are tightly bound and require that the type of object be known at compile time. In addition, in traditional environments, the expected parameter would have been passed into the function by value or by reference. Thus, the present parsing (e.g., "shredding") mechanism allows programmers to specify the type of parameter without requiring them to specifically know how the values for these parameters are obtained.

For example, given the following declaration for the cmdlet Foo:

```
class Foo : Cmdlet
{
    string Name;
    Bool Recurse;
}
```

The command line syntax may be any of the following:
$ Foo-Name: (string)-Recurse: True
$ Foo-Name<string>-Recurse True
$Foo-Name (string).

The set of rules may be modified by system administrators in order to yield a desired syntax. In addition, the parser may support multiple sets of rules, so that more than one syntax can be used by users. In essence, the grammar associated with the cmdlet structure (e.g., string Name and Bool Recurse) drives the parser.

In general, the parsing directives describe how the parameters entered as the command string should map to the expected parameters identified in the cmdlet object. The input parameter types are checked to determine whether correct. If the input parameter types are not correct, the input parameters may be coerced to become correct. If the input parameter types are not correct and can not be coerced, a usage error is printed. The usage error allows the user to become aware of the correct syntax that is expected. The usage error may obtain information describing the syntax from the Documentation Directives. Once the input parameter types have either been mapped or have been verified, the corresponding members in the cmdlet object instance are populated. As the members are populated, the extended type manager provides processing of the input parameter types. Briefly, the processing may include a property path mechanism, a key mechanism, a compare mechanism, a conversion mechanism, a globber mechanism, a relationship mechanism, and a property set mechanism. Each of these mechanisms is described in detail below in the section entitled "Extended Type Manager Processing", which also includes illustrative examples.

Exemplary Process for Executing the Cmdlet

Figure 17:
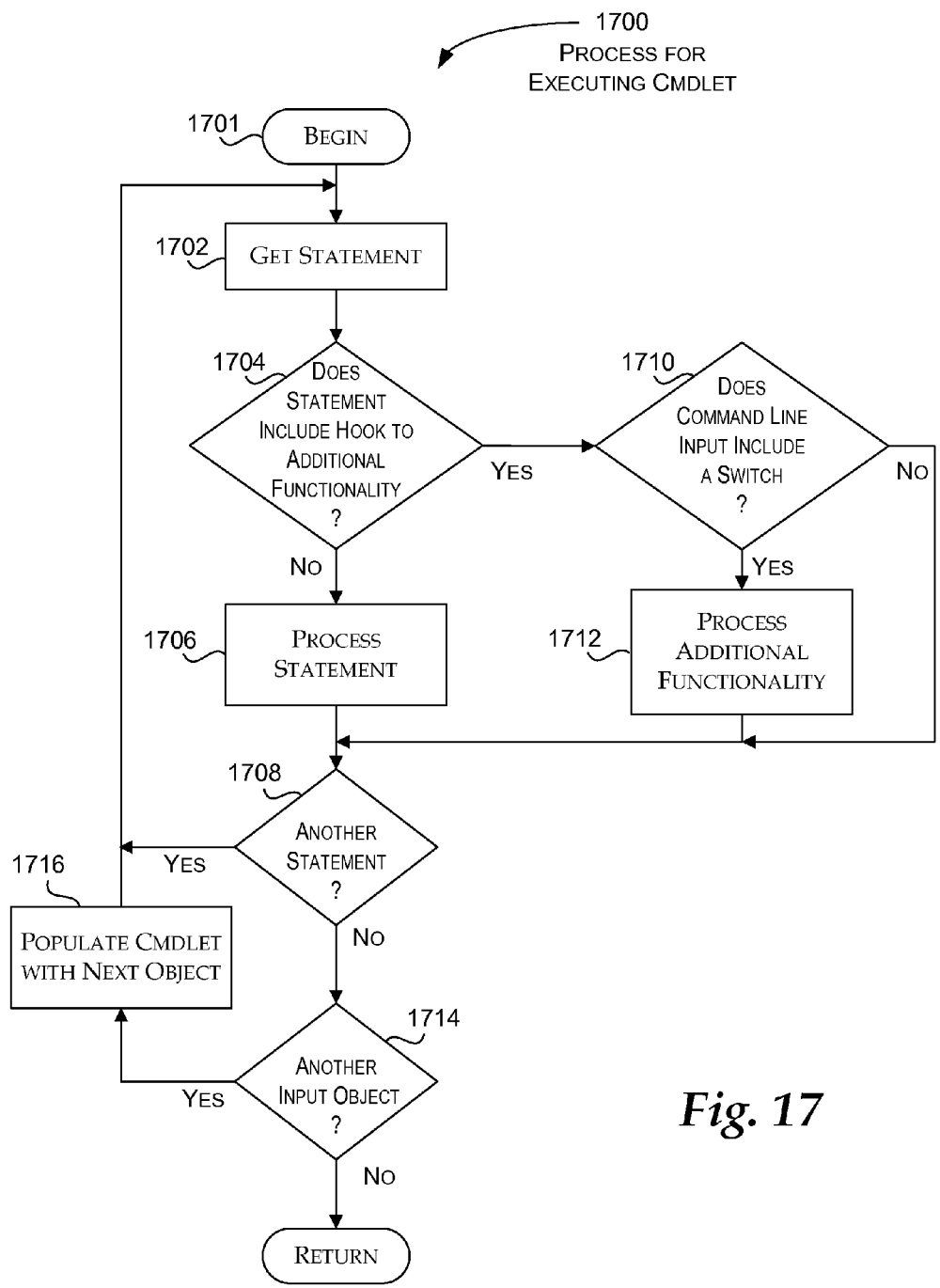
FIG. 17 is a logical flow diagram illustrating an exemplary process for executing the cmdlet suitable for use within the processing of commands shown in FIG. 14.

An exemplary process for executing a cmdlet is illustrated in FIG. 17 and is now described. In one exemplary administrative tool environment, the core engine executes the cmdlet. As mentioned above, the code 1442 within the second method 1440 is executed for each input object. Processing begins at block 1701 where the cmdlet has already been populated. Processing continues at block 1702.

At block 1702, a statement from the code 542 is retrieved for execution. Processing continues at decision block 1704.

At decision block 1704, a determination is made whether a hook is included within the statement. Turning briefly to FIG. 5, the hook may include calling an API provided by the core engine. For example, statement 550 within the code 542 of cmdlet 500 in FIG. 5 calls the confirm processing API specifying the necessary parameters, a first string (e.g., "PID="), and a parameter (e.g., PID). Turning back to FIG. 17, if the statement includes the hook, processing continues to block 1712. Thus, if the instruction calling the confirm processing API is specified, the cmdlet operates in an alternate executing mode that is provided by the operating environment. Otherwise, processing continues at block 1706 and execution continues in the "normal" mode.

At block 1706, the statement is processed. Processing then proceeds to decision block 1708. At block 1708, a determination is made whether the code includes another statement. If there is another statement, processing loops back to block 1702 to get the next statement and proceeds as described above. Otherwise, processing continues to decision block 1714.

At decision block 1714, a determination is made whether there is another input object to process. If there is another input object, processing continues to block 1716 where the cmdlet is populated with data from the next object. The population process described in FIG. 16 is performed with the next object. Processing then loops back to block 1702 and proceeds as described above. Once all the objects have been processed, the process for executing the cmdlet is complete and returns.

Returning back to decision block 1704, if the statement includes the hook, processing continues to block 1712. At block 1712, the additional features provided by the administrative tool environment are processed. Processing continues at decision block 1708 and continues as described above.

The additional processing performed within block 1712 is now described in conjunction with the exemplary data structure 600 illustrated in FIG. 6. As explained above, within the command base class 600 there may be parameters declared that correspond to additional expected input parameters (e.g., a switch).

The switch includes a predetermined string, and when recognized, directs the core engine to provide additional functionality to the cmdlet. If the parameter verbose 610 is specified in the command input, verbose statements 614 are executed. The following is an example of a command line that includes the verbose switch:

$ get/process| where "han*-gt 500" | stop/process-verbose.

In general, when "-verbose" is specified within the command input, the core engine executes the command for each input object and forwards the actual command that was executed for each input object to the host program for display. The following is an example of output generated when the above command line is executed in the exemplary administrative tool environment:

$ stop/process PID=15
$ stop/process PID=33.

If the parameter whatif 620 is specified in the command input, whatif statements 624 are executed. The following is an example of a command line that includes the whatif switch:

$ get/process| where "han*-gt 500" | stop/process-whatif.

In general, when "-whatif" is specified, the core engine does not actually execute the code 542, but rather sends the commands that would have been executed to the host program for display. The following is an example of output generated when the above command line is executed in the administrative tool environment of the present invention:

$ stop/process PID=15
$ stop/process PID=33.

If the parameter confirm 630 is specified in the command input, confirm statements 634 are executed. The following is an example of a command line that includes the confirm switch:

$ get/process| where "han*-gt 500" | stop/process-confirm.

In general, when "-confirm" is specified, the core engine requests additional user input on whether to proceed with the command or not. The following is an example of output generated when the above command line is executed in the administrative tool environment of the present invention.

$ stop/process PID 15
Y/N Y
$ stop/process PID 33
Y/N N.

As described above, the exemplary data structure 600 may also include a security method 640 that determines whether the task being requested for execution should be allowed. In traditional administrative environments, each command is responsible for checking whether the person executing the command has sufficient privileges to perform the command. In order to perform this check, extensive code is needed to access information from several sources. Because of these complexities, many commands did not perform a security check. The inventors of the present administrative tool environment recognized that when the task is specified in the command input, the necessary information for performing the security check is available within the administrative tool environment. Therefore, the administrative tool framework performs the security check without requiring complex code from the tool developers. The security check may be performed for any cmdlet that defines the hook within its cmdlet. Alternatively, the hook may be an optional input parameter that can be specified in the command input, similar to the verbose parameter described above.

The security check is implemented to support roles based authentication, which is generally defined as a system of controlling which users have access to resources based on the role of the user. Thus, each role is assigned certain access rights to different resources. A user is then assigned to one or more roles. In general, roles based authentication focus on three items: principle, resource, and action. The principle identifies who requested the action to be performed on the resource.

The inventors of the present invention recognized that the cmdlet being requested corresponded to the action that was to be performed. In addition, the inventors appreciated that the owner of the process in which the administrative tool framework was executing corresponded to the principle. Further, the inventors appreciated that the resource is specified within the cmdlet. Therefore, because the administrative tool framework has access to these items, the inventors recognized that the security check could be performed from within the administrative tool framework without requiring tool developers to implement the security check.

The operation of the security check may be performed any time additional functionality is requested within the cmdlet by using the hook, such as the confirm processing API. Alternatively, security check may be performed by checking whether a security switch was entered on the command line, similar to verbose, whatif, and confirm. For either implementation, the checkSecurity method calls an API provided by a security process (not shown) that provides a set of APIs for determining who is allowed. The security process takes the information provided by the administrative tool framework and provides a result indicating whether the task may be completed. The administrative tool framework may then provide an error or just stop the execution of the task.

Thus, by providing the hook within the cmdlet, the developers may use additional processing provided by the administrative tool framework.

Exemplary Extended Type Manager Processing

As briefly mentioned above in conjunction with FIG. 18, the extended type manager may perform additional processing on objects that are supplied. The additional processing may be performed at the request of the parser 220, the script engine 222, or the pipeline processor 402. The additional processing includes a property path mechanism, a key mechanism, a compare mechanism, a conversion mechanism, a globber mechanism, a relationship mechanism, and a property set mechanism. Those skilled in the art will appreciate that the extended type manager may also be extended with other processing without departing from the scope of the claimed invention. Each of the additional processing mechanisms is now described.

First, the property path mechanism allows a string to navigate properties of objects. In current reflection systems, queries may query properties of an object. However, in the present extended type manager, a string may be specified that will provide a navigation path to successive properties of objects. The following is an illustrative syntax for the property path: P1.P2.P3.P4.

Each component (e.g., P1, P2, P3, and P4) comprises a string that may represent a property, a method with parameters, a method without parameters, a field, an XPATH, or the like. An XPATH specifies a query string to search for an element (e.g., "/FOO@=13"). Within the string, a special character may be included to specifically indicate the type of component. If the string does not contain the special character, the extended type manager may perform a lookup to determine the type of component. For example, if component P1 is an object, the extended type manager may query whether P2 is a property of the object, a method on the object, a field of the object, or a property set. Once the extended type manager identifies the type for P2, processing according to that type is performed. If the component is not one of the above types, the extended type manager may further query the extended sources to determine whether there is a conversion function to convert the type of P1 into the type of P2. These and other lookups will now be described using illustrative command strings and showing the respective output.

The following is an illustrative string that includes a property path:

$ get/process|/where hand*-gt>500|format/table name-.toupper, ws.kb, exe*.ver*.description.tolower.trunc(30).

In the above illustrative string, there are three property paths: (1) "name.toupper"; (2) "ws.kb"; and (3) "exe*.ver*.description.tolower.trunc(30). Before describing these property paths, one should note that "name", "ws", and "exe" specify the properties for the table. In addition, one should note that each of these properties is a direct property of the incoming object, originally generated by "get/process" and then pipelined through the various cmdlets. Processing involved for each of the three property paths will now be described.

In the first property path (i.e., "name.toupper"), name is a direct property of the incoming object and is also an object itself. The extended type manager queries the system using the priority lookup described above to determine the type for toupper. The extended type manager discovers that toupper is not a property. However, toupper may be a method inherited by a string type to convert lower case letters to upper case letters within the string. Alternatively, the extended type manager may have queried the extended metadata to determine whether there is any third party code that can convert a name object to upper case. Upon finding the component type, processing is performed in accordance with that component type.

In the second property path (i.e., "ws.kb"), "ws" is a direct property of the incoming object and is also an object itself. The extended type manager determines that "ws" is an integer. Then, the extended type manager queries whether kb is a property of an integer, whether kb is a method of an integer, and finally queries whether any code knows how to take an integer and convert the integer to a kb type. Third party code is registered to perform this conversion and the conversion is performed.

In the third property path (i.e., "exe*.ver*.description.tolower.trunc(30)"), there are several components. The first component ("exe*") is a direct property of the incoming object and is also an object. Again, the extended type manager proceeds down the lookup query in order to process the second component ("ver*"). The "exe*" object does not have a "ver*" property or method, so the extend type manager queries the extended metadata to determine whether there is any code that is registered to convert an executable name into a version. For this example, such code exists. The code may take the executable name string and use it to open a file, then accesses the version block object, and return the description property (the third component ("description")) of the version block object. The extended type manager then performs this same lookup mechanism for the fourth component ("tolower") and the fifth component ("trunc(40)"). Thus, as illustrated, the extended type manager may perform quite elaborate processing on a command string without the administrator needing to write any specific code. Table 1 illustrates output generated for the illustrative string.

TABLE 1

| Name.toupper | ws.kb | exe*.ver*.description.tolower.trunc(30) |
|---|---|---|
| ETCLIENT | 29,964 | etclient |
| CSRSS | 6,944 | |
| SVCHOST | 28,944 | generic host process for win32 |
| OUTLOOK | 18,556 | office outlook |
| MSMSGS | 13,248 | messenger |

Another query mechanism 1824 includes a key. The key identifies one or more properties that make an instance of the data type unique. For example, in a database, one column may be identified as the key which can uniquely identify each row (e.g., social security number). The key is stored within the type metadata 1840 associated with the data type. This key may then be used by the extended type manager when processing objects of that data type. The data type may be an extended data type or an existing data type.

Another query mechanism 1824 includes a compare mechanism. The compare mechanism compares two objects. If the two objects directly support the compare function, the directly supported compare function is executed. However, if neither object supports a compare function, the extended type manager may look in the type metadata for code that has been registered to support the compare between the two objects. An illustrative series of command line strings invoking the compare mechanism is shown below, along with corresponding output in Table 2.

TABLE 2

| $ $a = $( get/date ) | |
|---|---|
| $ start/sleep 5 | |
| $ $b = $( get/date | |
| compare/time $a $b | |
| Ticks | 51196579 |
| Days | 0 |
| Hours | 0 |
| Milliseconds | 119 |
| Minutes | 0 |
| Seconds | 5 |
| TotalDays | 5.92552997685185E−05 |
| TotalHours | 0.00142212719444444 |
| TotalMilliseconds | 5119.6579 |

TABLE 2-continued

```
$ $a = $( get/date )
$ start/sleep 5
$ $b = $( get/date
compare/time $a $b
```

| TotalMinutes | 0.0853276316666667 |
|---|---|
| TotalSeconds | 5.1196579 |

Compare/time cmdlet is written to compare two datetime objects. In this case, the DateTime object supports the IComparable interface.

Another query mechanism 1824 includes a conversion mechanism. The extended type manager allows code to be registered stating its ability to perform a specific conversion. Then, when an object of type A is input and a cmdlet specifies an object of type B, the extended type manager may perform the conversion using one of the registered conversions. The extended type manager may perform a series of conversions in order to coerce type A into type B. The property path described above ("ws.kb") illustrates a conversion mechanism.

Another query mechanism 1824 includes a globber mechanism. A globber refers to a wild card character within a string. The globber mechanism inputs the string with the wild card character and produces a set of objects. The extended type manager allows code to be registered that specifies wildcard processing. The property path described above ("exe*.ver*.description.tolower.trunc(30))") illustrates the globber mechanism. A registered process may provide globbing for file names, file objects, incoming properties, and the like.

Another query mechanism 1824 includes a property set mechanism. The property set mechanism allows a name to be defined for a set of properties. An administrator may then specify the name within the command string to obtain the set of properties. The property set may be defined in various ways. In one way, a predefined parameter, such as "?", may be entered as an input parameter for a cmdlet. The operating environment upon recognizing the predefined parameter lists all the properties of the incoming object. The list may be a GUI that allows an administrator to easily check (e.g., "click on") the properties desired and name the property set. The property set information is then stored in the extended metadata. An illustrative string invoking the property set mechanism is shown below, along with corresponding output in Table 3:

$ get/process| where han*-gt>500| format/table config.

In this illustrative string, a property set named "config" has been defined to include a name property, a process id property (Pid), and a priority property. The output for the table is shown below.

TABLE 3

| Name | Pid | Priority |
|---|---|---|
| ETClient | 3528 | Normal |
| csrss | 528 | Normal |
| svchost | 848 | Normal |
| OUTLOOK | 2,772 | Normal |
| msmsgs | 2,584 | Normal |

Another query mechanism 1824 includes a relationship mechanism. In contrast to traditional type systems that support one relationship (i.e., inheritance), the relationship mechanism supports expressing more than one relationship between types. Again, these relationships are registered. The relationship may include finding items that the object consumes or finding the items that consume the object. The extended type manager may access ontologies that describe various relationships. Using the extended metadata and the code, a specification for accessing any ontology service, such as OWL, DAWL, and the like, may be described. The following is a portion of an illustrative string which utilizes the relationship mechanism: .OWL:"string".

The "OWL" identifier identifies the ontology service and the "string" specifies the specific string within the ontology service. Thus, the extended type manager may access types supplied by ontology services.

Exemplary Process for Displaying Command Line Data

The present mechanism provides a data driven command line output. The formatting and outputting of the data is provided by one or more cmdlets in the pipeline of cmdlets. Typically, these cmdlets are included within the non-management cmdlets described in conjunction with FIG. 2 above. The cmdlets may include a format cmdlet, a markup cmdlet, a convert cmdlet, a transform cmdlet, and an out cmdlet.

Figure 19:
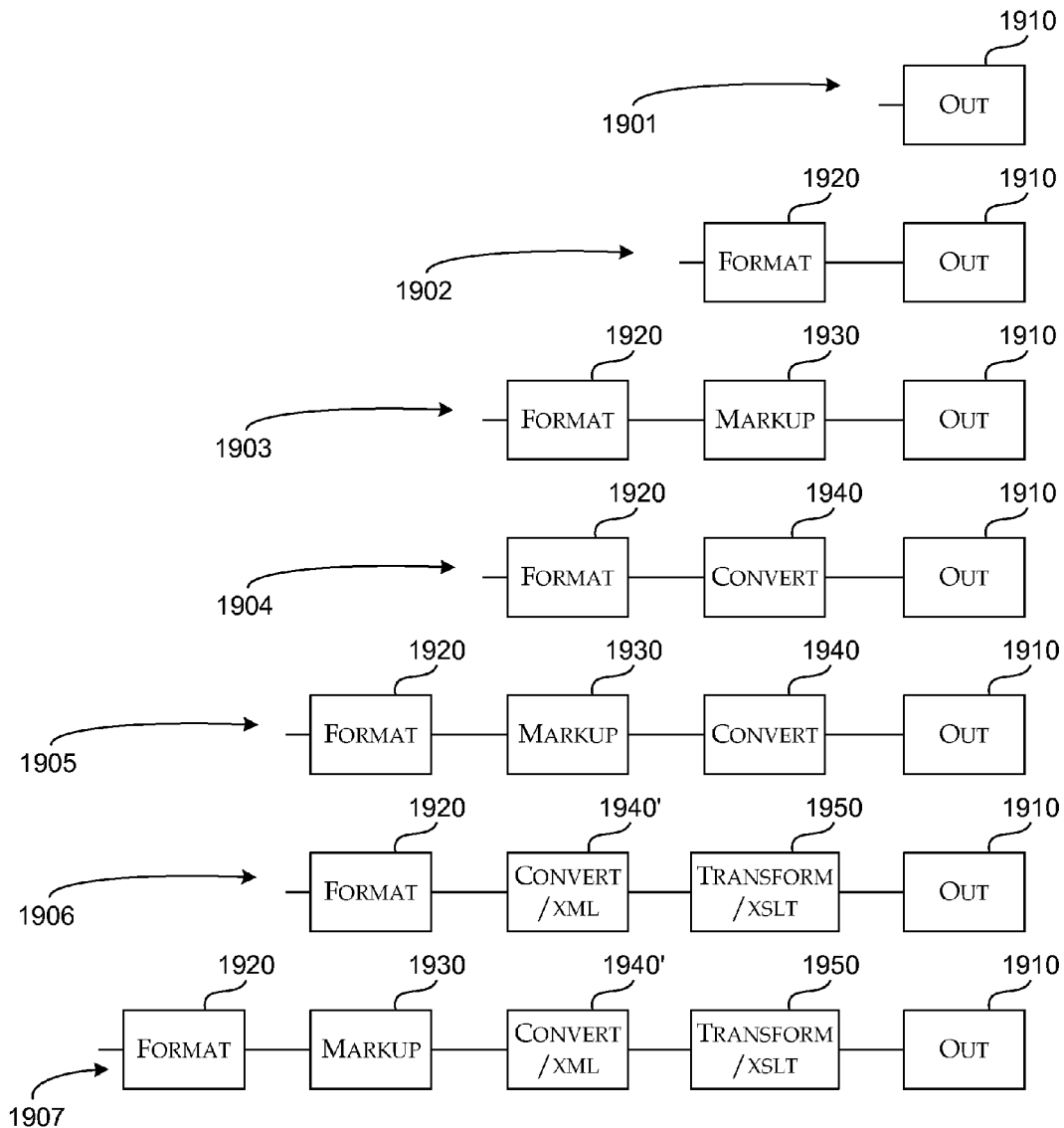
FIG. 19 graphically depicts exemplary sequences for output processing cmdlets within a pipeline.

FIG. 19 graphically depicts exemplary sequences 1901-1907 of these cmdlets within a pipeline. The first sequence 1901 illustrates the out cmdlet 1910 as the last cmdlet in the pipeline. In the same manner as described above for other cmdlets, the out cmdlet 1910 accepts a stream of pipeline objects generated and processed by other cmdlets within the pipeline. However, in contrast to most cmdlets, the out cmdlet 1910 does not emit pipeline objects for other cmdlets. Instead, the out cmdlet 1910 is responsible for rendering/displaying the results generated by the pipeline. Each out cmdlet 1910 is associated with an output destination, such as a device, a program, and the like. For example, for a console device, the out cmdlet 1910 may be specified as out/console; for an internet browser, the out cmdlet 1910 may be specified as out/browser; and for a window, the out cmdlet 1910 may be specified as out/window. Each specific out cmdlet is familiar with the capabilities of its associated destination. Locale information (e.g., date &currency formats) are processed by the out cmdlet 1910, unless a convert cmdlet preceded the out cmdlet in the pipeline. In this situation, the convert cmdlet processed the local information.

Each host is responsible for supporting certain out cmdlets, such as out/console. The host also supports any destination specific host cmdlet (e.g., out/chart that directs output to a chart provided by a spreadsheet application). In addition, the host is responsible for providing default handling of results. The out cmdlet in this sequence may decide to implement its behavior by calling other output processing cmdlets (such as format/markup/convert/transform). Thus, the out cmdlet may implicitly modify sequence 1901 to any of the other sequences or may add its own additional format/output cmdlets.

The second sequence 1902 illustrates a format cmdlet 1920 before the out cmdlet 1910. For this sequence, the format cmdlet 1920 accepts a stream of pipeline objects generated and processed by other cmdlets within the pipeline. In overview, the format cmdlet 1920 provides a way to select display properties and a way to specify a page layout, such as shape, column widths, headers, footers, and the like. The shape may include a table, a wide list, a columnar list, and the like. In addition, the format cmdlet 1920 may include computations of totals or sums. Exemplary processing performed by a format cmdlet 1920 is described below in conjunction with FIG. 20. Briefly, the format cmdlet emits format objects, in addition to emitting pipeline objects. The format objects can be recognized downstream by an out cmdlet (e.g., out cmdlet 1920 in sequence 1902) via the extended type manager or other mechanism. The out cmdlet 1920 may choose to either use the emitted format objects or may choose to ignore them. The out cmdlet determines the page layout based on the page layout data specified in the display information. In certain instances, modifications to the page layout may be specified by the out cmdlet. In one exemplary process the out cmdlet may determine an unspecified column width by finding a maximum length for each property of a predetermined number of objects (e.g., 50) and setting the column width to the maximum length. The format objects include formatting information, header/footer information, and the like.

The third sequence 1903 illustrates a format cmdlet 1920 before the out cmdlet 1910. However, in the third sequence 1903, a markup cmdlet 1930 is pipelined between the format cmdlet 1920 and the out cmdlet 1910. The markup cmdlet 1930 provides a mechanism for adding property annotation (e.g., font, color) to selected parameters. Thus, the markup cmdlet 1930 appears before the output cmdlet 1910. The property annotations may be implemented using a "shadow property bag", or by adding property annotations in a custom namespace in a property bag. The markup cmdlet 1930 may appear before the format cmdlet 1920 as long as the markup annotations may be maintained during processing of the format cmdlet 1920.

The fourth sequence 1904 again illustrates a format cmdlet 1920 before the out cmdlet 1910. However, in the fourth sequence 1904, a convert cmdlet 1940 is pipelined between the format cmdlet 1920 and the out cmdlet 1910. The convert cmdlet 1940 is also configured to process the format objects emitted by the format cmdlet 1920. The convert cmdlet 1940 converts the pipelined objects into a specific encoding based on the format objects. The convert cmdlet 1940 is associated with the specific encoding. For example, the convert cmdlet 1940 that converts the pipelined objects into Active Directory Objects (ADO) may be declared as "convert/ADO" on the command line. Likewise, the convert cmdlet 1940 that converts the pipelined objects into comma separated values (csv) may be declared as "convert/csv" on the command line. Some of the convert cmdlets 1940 (e.g., convert/XML and convert/html) may be blocking commands, meaning that all the pipelined objects are received before executing the conversion. Typically, the out cmdlet 1920 may determine whether to use the formatting information provided by the format objects. However, when a convert cmdlet 1920 appears before the out cmdlet 1920, the actual data conversion has already occurred before the out cmdlet receives the objects. Therefore, in this situation, the out cmdlet can not ignore the conversion.

The fifth sequence 1905 illustrates a format cmdlet 1920, a markup cmdlet 1930, a convert cmdlet 1940, and an out cmdlet 1910 in that order. Thus, this illustrates that the markup cmdlet 1930 may occur before the convert cmdlet 1940.

The sixth sequence 1906 illustrates a format cmdlet 1920, a specific convert cmdlet (e.g., convert/xml cmdlet 1940'), a specific transform cmdlet (e.g., transform/xslt cmdlet 1950), and an out cmdlet 1910. The convert/xml cmdlet 1940' converts the pipelined objects into an extended markup language (XML) document. The transform/xslt cmdlet 1950 transforms the XML document into another XML document using an Extensible Style Language (XSL) style sheet. The transform process is commonly referred to as extensible style language transformation (XSLT), in which an XSL processor reads the XML document and follows the instructions within the XSL style sheet to create the new XML document.

The seventh sequence 1907 illustrates a format cmdlet 1920, a markup cmdlet 1930, a specific convert cmdlet (e.g., convert/xml cmdlet 1940'), a specific transform cmdlet (e.g., transform/xslt cmdlet 1950), and an out cmdlet 1910. Thus, the seventh sequence 1907 illustrates having the markup cmdlet 1930 upstream from the convert cmdlet and transform cmdlet.

Figure 20:
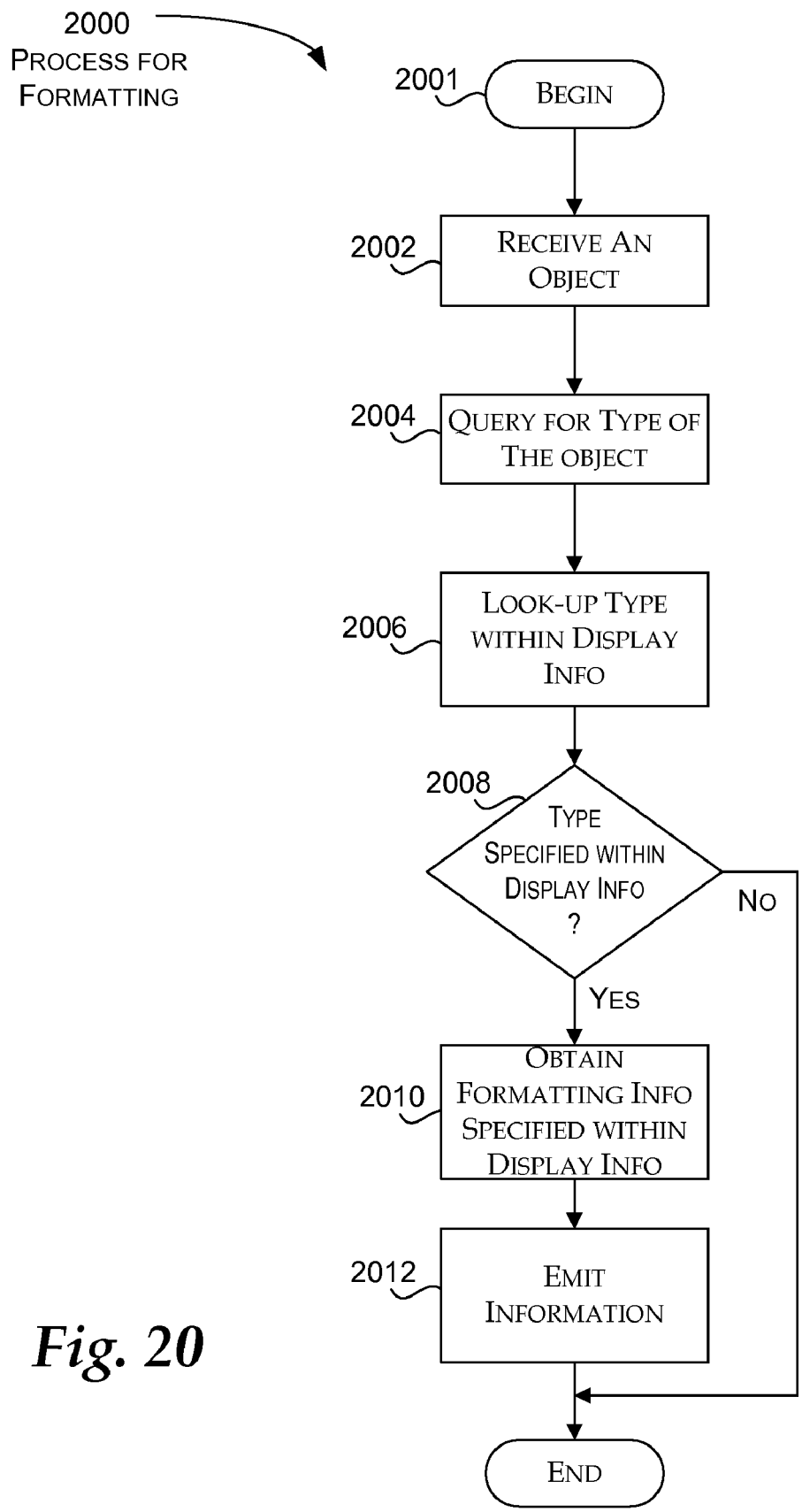
FIG. 20 illustrates exemplary processing performed by one of the output processing cmdlets shown in FIG. 19.

FIG. 20 illustrates exemplary processing 2000 performed by a format cmdlet. The formatting process begins at block 2001, after the format cmdlet has been parsed and invoked by the parser and pipeline processor in a manner described above. Processing continues at block 2002.

At block 2002, a pipeline object is received as input to the format cmdlet. Processing continues at block 2004.

At block 2004, a query is initiated to identify a type for the pipelined object. This query is performed by the extended type manager as described above in conjunction with FIG. 18. Once the extended type manager has identified the type for the object, processing continues at block 2006.

At block 2006, the identified type is looked up in display information. An exemplary format for the display information is illustrated in FIG. 21 and will be described below. Processing continues at decision block 2008.

At decision block 2008, a determination is made whether the identified type is specified within the display information. If there is no entry within the display information for the identified type, processing is complete. Otherwise, processing continues at block 2010.

At block 2010, formatting information associated with the identified type is obtained from the display information. Processing continues at block 2012.

At block 2012, information is emitted on the pipeline. Once the information is emitted, the processing is complete.

Exemplary information that may be emitted is now described in further detail. The information may include formatting information, header/footer information, and a group end/begin signal object. The formatting information may include a shape, a label, numbering/bullets, column widths, character encoding type, content font properties, page length, group-by-property name, and the like. Each of these may have additional specifications associated with it. For example, the shape may specify whether the shape is a table, a list, or the like. Labels may specify whether to use column headers, list labels, or the like. Character encoding may specify ASCII, UTF-8, Unicode, and the like. Content font properties may specify the font that is applied to the property values that are display. A default font property (e.g., Courier New, 10 point) may be used if content font properties are not specified.

The header/footer information may include a header/footer scope, font properties, title, subtitle, date, time, page numbering, separator, and the like. For example, the scope may specify a document, a page, a group, or the like. Additional properties may be specified for either the header or the footer. For example, for group and document footers, the additional properties may include properties or columns to calculate a sum/total, object counts, label strings for totals and counts, and the like.

The group end/begin signal objects are emitted when the format cmdlet detects that a group-by property has changed. When this occurs, the format cmdlet treats the stream of pipeline objects as previously sorted and does not re-sort them. The group end/begin signal objects may be interspersed with the pipeline objects. Multiple group-by properties may be specified for nested sorting. The format cmdlet may also emit a format end object that includes final sums and totals.

Turning briefly to FIG. 21, an exemplary display information 2100 is in a structured format and contains information (e.g., formatting information, header/footer information, group-by properties or methods) associated with each object that has been defined. For example, the display information 2100 may be XML-based. Each of the afore-mentioned properties may then be specified within the display information. The information within the display information 2100 may be populated by the owner of the object type that is being entered. The operating environment provides certain APIs and cmdlets that allow the owner to update the display information by creating, deleting, and modifying entries.

Figure 22:
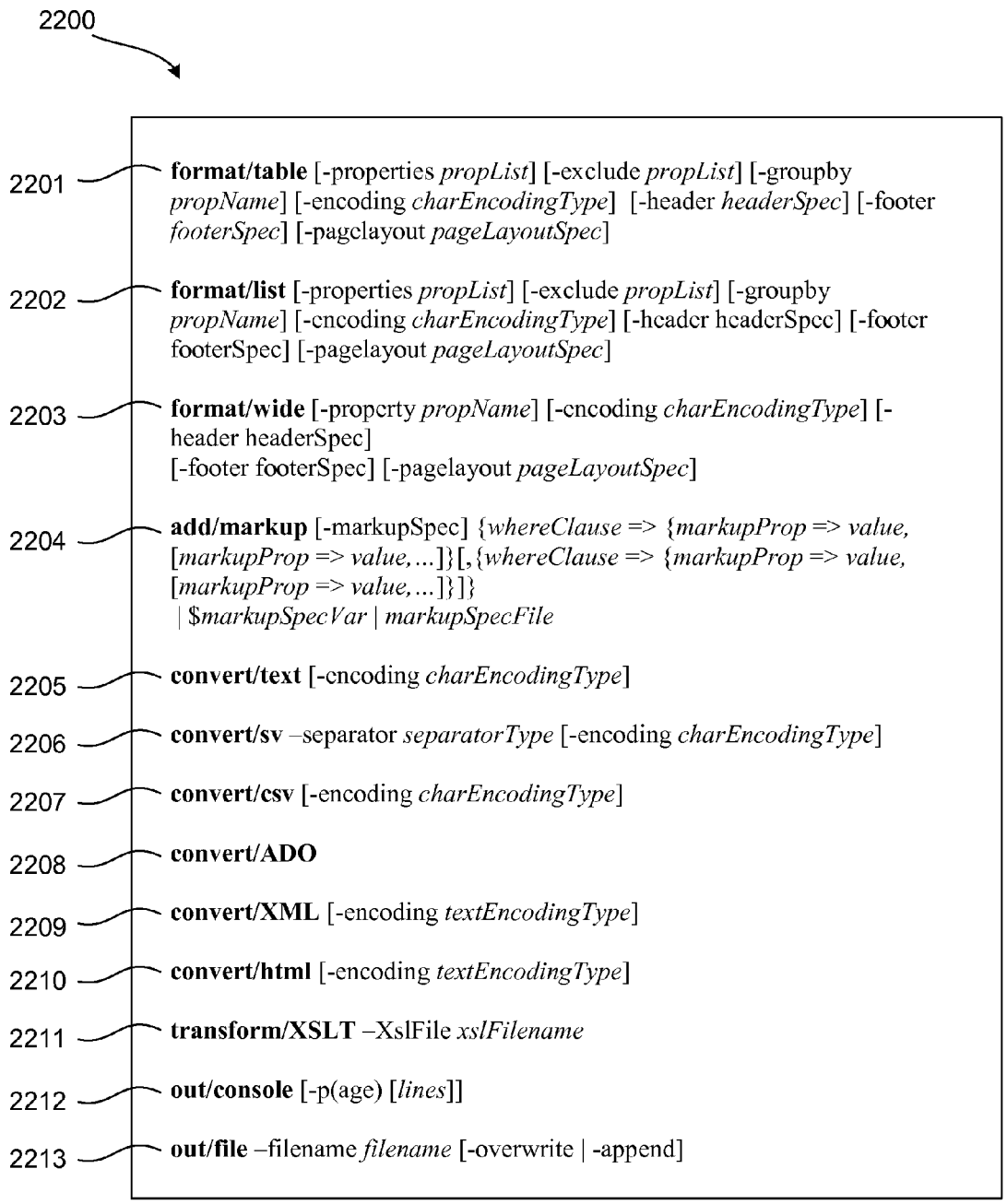
FIG. 22 is a table listing an exemplary syntax for exemplary output processing cmdlets.

FIG. 22 is a table listing an exemplary syntax 2201-2213 for certain format cmdlets (e., format/table, format/list, and format/wide), markup cmdlets (e.g., add/markup), convert cmdlets (e.g., convert/text, convert/sv, convert/csv, convert/ADO, convert/XML, convert/html), transform cmdlets (e.g., transform/XSLT) and out cmdlets (e.g., out/console, out/file). FIG. 23 illustrates results rendered by the out/console cmdlet using various pipeline sequences of the output processing cmdlets (e.g., format cmdlets, convert cmdlets, and markup cmdlets).

Because the present administrative tool framework allows tasks to be initiated from any host (e.g., the user-interface, the command line, programmatically), system administrators and product developers may share code and experiences which will make both types of users more effective and efficient. In addition, system administrators will only need to learn one set of concepts, commands, and troubleshooting techniques. Likewise, product developers will only need to create one provider cmdlet to leverage all the management tools.

Thus, as described, because the present administrative tool framework simplifies the access to and the control of management objects and provides transparent remoting, the present administrative tool framework decreases the skill level that is required to develop administrative tools. In addition, the framework allows developers to see the scripts run by GUI interactions which help the developers learn the framework and to create their own automated scripts. In addition, because testing has already been performed on the functionality provided by the framework, product level testing is reduced to only testing the GUI paths to invoke functions provided by the framework. Another benefit is that the management GUI can expose its inner workings via cmdlets which provides developers and testers easy access to the internal state and control of the GUI for debugging/diagnostics/automated test.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method comprising:
parsing an input and identifying at least one cmdlet based on the input; and
populating a parameter associated with the cmdlet using information from an input source, and executing the cmdlet to generate a precisely parseable stream, wherein the input source comprises the precisely parseable stream emitted from another cmdlet and wherein the precisely parseable stream does not comprise a live object.

2. The method of claim 1, further comprising configuring a host component to supply the input about at least one command.

3. The method of claim 2, wherein the host component supplies the input directly to the parser component.

4. The method of claim 2, wherein the host component supplies the input using a host cmdlet that is processed as one of the cmdlets within the engine component.

5. The method of claim 1, wherein the cmdlet includes a base cmdlet that provides a common utility that operates on a plurality of data types.

6. The method of claim 1, wherein the cmdlet includes a host cmdlet that provides a system utility.

7. The method of claim 1, wherein the parameter being associated with the cmdlet comprises a parameter declaration for the parameter within the cmdlet.

8. The method of claim 1, wherein the parameter being associated with the cmdlet comprises a reference to an external source defining the parameter.

9. The method of claim 1, wherein the cmdlet includes a provider cmdlet that provides functionality associated with an application.

10. A method comprising:
receiving an input;
associating a cmdlet with the input, the cmdlet identifying at least one expected input parameter;
for each expected input parameter that specifies obtaining data from the input, populating the expected input parameter with data from the input; and
for each expected input parameter that specifies obtaining information from an input stream to the cmdlet, populating the expected input parameter based on the information, executing the cmdlet to generate an object stream based on the information and the data, and emitting the object stream, wherein the input stream comprises the object stream emitted by another cmdlet and wherein the object stream does not comprise a live object.

11. The method of claim 10, wherein the input object comprises a .NET object, an XML document, or an Active Directory Object.

12. The method of claim 10, wherein the cmdlet and the other cmdlet operate in a same process.

13. The method of claim 10, wherein the cmdlet operates in a local process and the other cmdlet operates in a remote process.

14. The method of claim 10, wherein the input comprises a string.

15. The method of claim 10, wherein the input comprises a script.

16. A method comprising:
receiving input about at least one command;
parsing the input to identify one cmdlet;
populating a parameter defined within the cmdlet with information from an input source;
executing the cmdlet to generate an object stream; and
outputting the object stream, wherein the object stream does not comprise a live object.

17. A method comprising:
receiving an input;
parsing the input into at least one cmdlet, the cmdlet providing a means for describing at least one expected input parameter associated with an input source;
populating each expected input parameter; and
processing the cmdlet in a manner such that the input source comprises an output stream generated by another cmdlet, wherein the output stream does not comprise a live object.

18. The method of claim 17, wherein the one cmdlet and the other cmdlet execute within a same process.

19. A method comprising:
converting a user input to a input format recognized by an administrative tool framework;
forwarding the input format to the administrative tool framework, the administrative tool framework configured to parse the input format, and instantiate a cmdlet based on the input, the cmdlet specifying an expected input parameter; and
populating the expected input parameter from an input source, the input source does not comprise a live object.

20. The method of claim 19, wherein the user input comprises voice input.

* * * * *